(12) United States Patent
Chen et al.

(10) Patent No.: US 12,555,517 B2
(45) Date of Patent: Feb. 17, 2026

(54) DISPLAY SUBSTRATE AND DISPLAY DEVICE

(71) Applicants: NANJING BOE DISPLAY TECHNOLOGY CO., LTD., Nanjing (CN); BOE TECHNOLOGY GROUP CO., LTD., Beijing (CN)

(72) Inventors: Xu Chen, Beijing (CN); Honggang Gu, Beijing (CN); Yang Shu, Beijing (CN); Yulin Sun, Beijing (CN)

(73) Assignees: NANJING BOE DISPLAY TECHNOLOGY CO., LTD., Nanjing (CN); BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 18/700,950

(22) PCT Filed: Mar. 14, 2023

(86) PCT No.: PCT/CN2023/081393
§ 371 (c)(1),
(2) Date: Apr. 12, 2024

(87) PCT Pub. No.: WO2024/187378
PCT Pub. Date: Sep. 19, 2024

(65) Prior Publication Data
US 2025/0239205 A1    Jul. 24, 2025

(51) Int. Cl.
*G09G 3/32* (2016.01)
*G11C 19/28* (2006.01)
(52) U.S. Cl.
CPC ............. *G09G 3/32* (2013.01); *G11C 19/28* (2013.01); *G09G 2300/0408* (2013.01); *G09G 2310/0286* (2013.01); *G09G 2340/0435* (2013.01)

(58) Field of Classification Search
CPC ...... G09G 3/32; G09G 3/3266; G09G 3/3225; G09G 2300/0408; G09G 2310/0286;
(Continued)

(56) References Cited

U.S. PATENT DOCUMENTS 8,018,423 B2 * 9/2011 Tsai .................. G11C 19/28
377/64
9,620,240 B2    4/2017 So et al.
(Continued)

FOREIGN PATENT DOCUMENTS

CN       101504829 A    8/2009
CN       103151013 A    6/2013
(Continued)

OTHER PUBLICATIONS

International Search Report in PCT/CN2023/081393 in Chinese dated Nov. 14, 2023 with English translation.

*Primary Examiner* — Vijay Shankar
(74) *Attorney, Agent, or Firm* — Collard & Roe, P.C.

(57) ABSTRACT

A display substrate and a display device are provided. The display substrate includes a shift register including an input circuit, an output circuit, a first output pull-down circuit, and a second output pull-down circuit. The input circuit is configured to respond to a first drive signal on a control terminal of the input circuit to write an input signal on an input terminal of the input circuit into a first node. The output circuit is configured to respond to a signal on the first node to output a clock signal as a gate driving signal through an output terminal of the output circuit. The first and second output pull-down circuits are configured to reduce the falling time of the gate driving signals at two ends of a gate line.

20 Claims, 10 Drawing Sheets

(58) Field of Classification Search
CPC ......... G09G 2340/0435; G09G 3/3677; G09G 3/20; G09G 3/36; G11C 19/28
See application file for complete search history.

(56) References Cited

U.S. PATENT DOCUMENTS

| | | | |
|---|---|---|---|
| 10,283,066 B2 | 5/2019 | Hao | |
| 10,339,854 B2 | 7/2019 | Yang et al. | |
| 10,643,561 B2 | 5/2020 | Zhang et al. | |
| 12,277,882 B1* | 4/2025 | Zhou | G09G 3/3677 |
| 2008/0266275 A1 | 10/2008 | Tsai et al. | |
| 2017/0178583 A1* | 6/2017 | Zhang | G09G 3/3677 |
| 2019/0043412 A1* | 2/2019 | Yang | G09G 3/3677 |
| 2022/0327975 A1 | 10/2022 | Yan et al. | |
| 2024/0428716 A1* | 12/2024 | Wang | E02D 7/16 |
| 2025/0078768 A1* | 3/2025 | Feng | G11C 19/287 |

FOREIGN PATENT DOCUMENTS

| | | |
|---|---|---|
| CN | 105590601 A | 5/2016 |
| CN | 104134430 B | 8/2016 |
| CN | 104536229 B | 2/2017 |
| CN | 104217689 B | 4/2017 |
| CN | 106847227 A | 6/2017 |
| CN | 107507597 A | 12/2017 |
| CN | 108281104 A | 7/2018 |
| CN | 110010078 A | 7/2019 |
| CN | 110782940 A | 2/2020 |
| CN | 210865579 U | 6/2020 |
| CN | 112164365 A | 1/2021 |
| CN | 113129804 A | 7/2021 |
| CN | 114078457 A | 2/2022 |
| CN | 114495789 A | 5/2022 |

* cited by examiner

DISPLAY SUBSTRATE AND DISPLAY DEVICE

CROSS REFERENCE TO RELATED APPLICATIONS

This application is a national stage application, filed under 35 U.S.C. § 371, of International Patent Application No. PCT/CN2023/081393, filed on Mar. 14, 2023, which is incorporated by reference herein in its entirety.

TECHNICAL FIELD

Embodiments of the disclosure relate to a display substrate and a display device.

BACKGROUND

With the continuous development of display technology, there is a growing demand in the market for low-cost, narrow bezel, and lightweight designs of display devices. Against this background, Gate Driver on Array (GOA) technology has emerged as a research hotspot among major manufacturers.

GOA technology integrates gate driving circuits on display substrates that are equipped with arrays of pixel units, allowing the gate driving circuits to directly provide gate driving signals to the pixel unit array without the need for additional gate driving chips and corresponding bonding structures, thereby reducing costs and bezel width. Typically, GOA technology achieves the row-by-row activation of pixel unit arrays through cascaded multiple shift registers, enabling display products to present colorful images.

SUMMARY

The embodiments of the present disclosure provide a display substrate and a display device. The display substrate includes a substrate and a shift register, a clock signal line, and a first power voltage line disposed on the substrate. The clock signal line is configured to provide a clock signal to the shift register, and the first power voltage line is configured to provide a first power voltage to the shift register. The shift register includes an input circuit, an output circuit, and a first output pull-down circuit. The input circuit includes a control terminal, an input terminal, and an output terminal. The output circuit includes a control terminal, an input terminal, and an output terminal. The output terminal of the input circuit and the control terminal of the output circuit are connected to a first node. The input terminal of the output circuit is connected to the clock signal line. The input circuit is configured to respond to a first driving signal on the control terminal of the input circuit to write an input signal on the input terminal of the input circuit into the first node. The output circuit is configured to respond to the signal on the first node to output the clock signal on the clock signal line as a gate driving signal through the output terminal of the output circuit. The first output pull-down circuit includes a control terminal, an input terminal, and an output terminal. The input terminal of the first output pull-down circuit is connected to the first power voltage line. The output terminal of the first output pull-down circuit is connected to the output terminal of the output circuit. The first output pull-down circuit is configured to respond to a second driving signal on the control terminal of the first output pull-down circuit to reduce the falling time of the gate driving signal at the output terminal of the output circuit by the first power voltage line. Thus, the display substrate can adopt a GOA circuit with an odd-even interlace driving mode to further reduce costs and decrease border width while ensuring that the display substrate has a higher resolution and refresh rate by reducing the falling time of the gate driving signal output by the individual shift register, making the product more competitive in the market.

At least one embodiment disclosed herein provides a display substrate comprising: a substrate and a shift register, a clock signal line, and a first power voltage line disposed on the substrate. The clock signal line is configured to provide a clock signal to the shift register, and the first power voltage line is configured to provide a first power voltage to the shift register. The shift register includes an input circuit, an output circuit, and a first output pull-down circuit. The input circuit comprises a control terminal, an input terminal, and an output terminal, and the output circuit comprises a control terminal, an input terminal, and an output terminal. The output terminal of the input circuit and the control terminal of the output circuit are connected to a first node, and the input terminal of the output circuit is connected to the clock signal line. The input circuit is configured to respond to a first driving signal on the control terminal of the input circuit to write an input signal on the input terminal of the input circuit into the first node, and the output circuit is configured to respond to the signal on the first node to output the clock signal on the clock signal line as a gate driving signal through the output terminal of the output circuit. The first output pull-down circuit comprises a control terminal, an input terminal, and an output terminal. The input terminal of the first output pull-down circuit is connected to the first power voltage line, and the output terminal of the first output pull-down circuit is connected to the output terminal of the output circuit. The first output pull-down circuit is configured to respond to a second driving signal on the control terminal of the first output pull-down circuit to reduce the falling time of the gate driving signal at the output terminal of the output circuit by the first power voltage, wherein the falling edge of the gate driving signal overlaps with the rising edge of the second driving signal.

For example, the display substrate provided by an embodiment of the disclosure further comprises a gate line extending along a first direction; and a plurality of pixel rows arranged along a second direction intersecting the first direction, each of the pixel rows comprising multiple pixel units arranged along the first direction. The gate line is connected to the multiple pixel units in a pixel row to provide the gate driving signal to the multiple pixel units, the gate line comprises a first end and a second end located at opposite sides of the pixel row, the first end of the gate line is connected to the output terminal of the output circuit, the shift register further comprises a second output pull-down circuit which comprises a control terminal, an input terminal, and an output terminal, the input terminal of the second output pull-down circuit is connected to the first power voltage line, the second end of the gate line is connected to the output terminal of the second output pull-down circuit, the second output pull-down circuit is configured to respond to a third driving signal on the control terminal of the second output pull-down circuit to reduce the falling time of the gate driving signal at the second end by the first power voltage.

For example, in the display substrate provided in an embodiment of the disclosure, the second driving signal and the third driving signal are the same.

For example, in the display substrate provided in an embodiment of the disclosure, the substrate includes a display area and a peripheral area, the peripheral area comprises a first sub-peripheral area and a second sub-peripheral area located on opposite sides of the display area, wherein the input circuit, the output circuit, and the first output pull-down circuit of the shift register is located in one of the first sub-peripheral area and the second sub-peripheral area, and the second output pull-down circuit of the shift register is located in the other of the first sub-peripheral area and the second sub-peripheral area.

For example, in the display substrate provided in an embodiment of the disclosure, the display substrate comprises M shift registers and M gate lines, each of the M shift registers provides the gate driving signal to respective M gate lines, the ith shift register provides the gate driving signal to the ith gate line, where i is an integer greater than or equal to 1 and less than or equal to M, of the M shift registers, the (2n+1)th shift register is located in the first sub-peripheral area and the (2n+2)th shift register is located in the second sub-peripheral area, where n is an integer greater than or equal to 0.

For example, in the display substrate provided in an embodiment of the disclosure, the first sub-peripheral area comprises a first register region and a (2j+1)th register region, the second sub-peripheral area comprises a second register region and a (2j+2)th register region, the first register region and the second register region are arranged to be opposite to and spaced apart from each other, and the (2j+1)th register region and the (2j+2)th register region are arranged to be opposite to and spaced apart from each other, the first register region is provided with the input circuit, the output circuit, and the first output pull-down circuit of the first shift register and the second output pull-down circuit of the second shift register, the second register region is provided with the input circuit, the output circuit, and the first output pull-down circuit of the second shift register and the second output pull-down circuit of the first shift register, the (2j+1)th register region is provided with the input circuit, the output circuit, and the first output pull-down circuit of the (2j+1)th shift register and the second output pull-down circuit of the (2j+2)th shift register, the (2j+2)th register region is provided with the input circuit, the output circuit, and the first output pull-down circuits of the (2j+2)th shift register and the second output pull-down circuits of the (2j+1)th shift register, where j is an integer greater than or equal to 1.

For example, in the display substrate provided in an embodiment of the disclosure, the first sub-peripheral area comprises a first register region and a (2j+1)th register region, the second sub-peripheral area comprises a second register region and a (2j+2)th register region, the first register region and the second register region are arranged to be opposite to and spaced apart from each other, and the (2j+1)th register region and the (2j+2)th register region are arranged to be opposite to and spaced apart from each other, the first register region is provided with the input circuit, the output circuit, and the first output pull-down circuit of the first shift register, the second register region is provided with the input circuit, the output circuit, and the first output pull-down circuit of the second shift register and the second output pull-down circuit of the first shift register, the (2j+1)th register region is provided with the input circuit, the output circuit, and the first output pull-down circuit of the (2j+1)th shift register and the second output pull-down circuit of the (2j)th shift register, the (2j+2)th register region is provided with the input circuit, the output circuit, and the first output pull-down circuit of the (2j+2)th shift register and the second output pull-down circuit of the (2j+1)th shift register, where j is an integer greater than or equal to 1.

For example, in the display substrate provided in an embodiment of the disclosure, the second output pull-down circuit of the first shift register is disposed on a side of the second register region away from the (2j+2)th shift register.

For example, in the display substrate provided in an embodiment of the disclosure, the control terminal of the first output pull-down circuit of the mth shift register is electrically connected to the output terminal of the output circuit of the (m+k)th shift register, where m is an integer greater than or equal to 1 and k is an integer greater than or equal to 1.

For example, in the display substrate provided in an embodiment of the disclosure, the display substrate comprises p clock signal lines, and k=p/2.

For example, in the display substrate provided in an embodiment of the disclosure, the control terminal of the second output pull-down circuit of the mth shift register is electrically connected to the output terminal of the output circuit of the (m+k)th shift register.

For example, in the display substrate provided in an embodiment of the disclosure, the input circuit comprises an input transistor, the output circuit comprises an output transistor, and the first output pull-down circuit comprises a first pull-down transistor, wherein the input transistor comprises a gate electrode, a first electrode, and a second electrode, the output transistor comprises a gate electrode, a first electrode, and a second electrode, the first pull-down transistor comprises a gate electrode, a first electrode, and a second electrode, the second electrode of the input transistor and the gate electrode of the output transistor are connected to the first node, the first electrode of the output transistor is connected to the clock signal line, the first electrode of the first pull-down transistor is configured to receive the first power voltage, and the second electrode of the first pull-down transistor is connected to the second electrode of the output transistor.

For example, in the display substrate provided in an embodiment of the disclosure, the (2n+1)th shift register and the (2n+2)th shift register are arranged to be opposite to and spaced apart from each other; in the (2n+1)th shift register, an orthographic projection of the first pull-down transistor on the substrate is located on a side of an orthographic projection of the output transistor on the substrate close to the (2n+2)th shift register; in the (2n+2)th shift register, an orthographic projection of the first pull-down transistor on the substrate is located on a side of an orthographic projection of the output transistor on the substrate close to the (2n+1)th shift register.

For example, in the display substrate provided in an embodiment of the disclosure, the second output pull-down circuit comprises a second pull-down transistor comprising a gate electrode, a first electrode, and a second electrode, the first electrode of the second pull-down transistor is configured to receive the first power voltage, and the second electrode of the second pull-down transistor is connected to the second end of the gate line.

For example, in the display substrate provided in an embodiment of the disclosure, the (2n+1)th shift register and the (2n+2)th shift register are arranged to be opposite to and spaced apart from each other; an orthographic projection of the second pull-down transistor of the (2n+1)th shift register on the substrate is located between an orthographic projection of the output transistor of the (2n+2)th shift register on the substrate and an orthographic projection of the first pull-down transistor of the (2n+2)th shift register on the substrate; an orthographic projection of the second pull-down transistor of the (2n+2)th shift register on the substrate is located between an orthographic projection of the output transistor of the (2n+1)th shift register and an orthographic projection of the first pull-down transistor of the (2n+1)th shift register on the substrate.

For example, in the display substrate provided in an embodiment of the disclosure, a width to length ratio of a channel of the second pull-down transistor is greater than a width to length ratio of the channel of the first pull-down transistor.

For example, in the display substrate provided in an embodiment of the disclosure, the width to length ratio of the channel of the first pull-down transistor is less than a width to length ratio of a channel of the output transistor, and the width to length ratio of the channel of the second pull-down transistor is greater than the width to length ratio of the channel of the output transistor.

For example, in the display substrate provided in an embodiment of the disclosure, the shift register further comprises a first control circuit, a second control circuit, a first noise reduction circuit, and a second noise reduction circuit; an output terminal of the first control circuit and an output terminal of the second control circuit are connected to a second node, a control terminal and an input terminal of the first control circuit are connected to a second power voltage line, an input terminal of the second control circuit is configured to receive the first power voltage, and a control terminal of the second control circuit is connected to the first node, the first control circuit is configured to respond to a second power voltage on the second power voltage line and pull up a potential of the second node by the second power voltage, the second control circuit is configured to respond to the signal on the first node to pull down the potential of the second node by the first power voltage; a control terminal of the first noise reduction circuit and a control terminal of the second noise reduction circuit are connected to the second node, an input terminal of the first noise reduction circuit and an input terminal of the second noise reduction circuit are configured to receive the first power voltage, an output terminal of the first noise reduction circuit is connected to the first node, and an output terminal of the second noise reduction circuit is connected to the output terminal of the output circuit, the first noise reduction circuit is configured to respond to the signal on the second node to reduce noise on the first node by the first power voltage, the second noise reduction circuit is configured to respond to the signal on the second node to reduce noise on the output terminal of the output circuit by the first power voltage.

For example, in the display substrate provided in an embodiment of the disclosure, the first control circuit comprises a first control transistor, the second control circuit comprises a second control transistor, the first noise reduction circuit comprises a first noise reduction transistor, and the second noise reduction circuit comprises a second noise reduction transistor, the first control transistor comprises a gate electrode, a first electrode, and a second electrode, the second control transistor comprises a gate electrode, a first electrode, and a second electrode, the first noise reduction transistor comprises a gate electrode, a first electrode, and a second electrode, the second noise reduction transistor comprises a gate electrode, a first electrode, and a second electrode, the first electrode and the gate electrode of the first control transistor are connected to the second power voltage line, the second electrode of the first control transistor and the second electrode of the second control transistor are connected to the second node, the gate electrode of the second control transistor is connected to the first node, the first electrode of the second control transistor is connected to the first power voltage line, the gate electrode of the first noise reduction transistor and the gate electrode of the second noise reduction transistor are connected to the second node, the first electrode of the first noise reduction transistor and the first electrode of the second noise reduction transistor are configured to receive the first power voltage, the second electrode of the first noise reduction transistor is connected to the first node, and the second electrode of the second noise reduction transistor is connected to the output terminal of the output circuit.

For example, in the display substrate provided in an embodiment of the disclosure, the shift registers further comprise a clear circuit comprising a control terminal, an input terminal, and an output terminal, wherein the control terminal of the reset circuit is configured to respond to a fourth driving signal to reset the signal on the first node by the first power voltage.

For example, in the display substrate provided in an embodiment of the disclosure, the reset circuit comprises a reset transistor, comprising a gate electrode, a first electrode, and a second electrode, wherein the first electrode of the reset transistor is connected to the first power voltage line, and the second electrode of the reset transistor is connected to the first node.

For example, in the display substrate provided in an embodiment of the disclosure, the display substrate comprises p clock signal lines, the control terminal of the reset circuit of the nth shift register is electrically connected to the output terminal of any one of the (n+k)th to (n+p−1)th shift registers, and k=p/2.

At least one embodiment of the disclosure provides a display device comprising the display substrate according to any embodiments as mentioned above.

BRIEF DESCRIPTION OF DRAWINGS

In order to further illustrate the technical solution of the embodiments of the disclosure, a brief description of the drawings of the embodiments is provided below. It is evident that the drawings described below are merely illustrative of some embodiments of the disclosure, and do not limit the scope of the embodiments of the disclosure.

DETAILED DESCRIPTION

Figure 1:
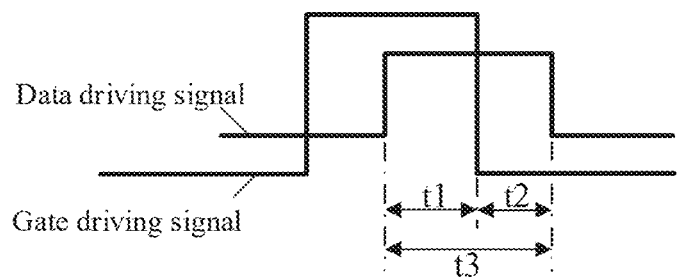
FIG. 1 illustrates a schematic diagram of the coordination between gate driving signals and data driving signals.

To clarify the purpose, technical solutions, and advantages of the embodiments of the disclosure, the technical solutions of the embodiments of the disclosure will be described clearly and completely with reference to the drawings of the embodiments of the disclosure. Obviously, the described embodiments are part of the embodiments of the disclosure, not all of them. Based on the described embodiments of the disclosure, all other embodiments obtained by those skilled in the art without inventive labor are within the scope of protection of the embodiments of the disclosure.

Unless otherwise defined, the technical terms or scientific terms used herein should be understood in their ordinary meaning to those skilled in the art to which the embodiments of the disclosure belong. The terms "first," "second," and similar words used herein do not indicate any order, quantity, or importance, but are merely used to distinguish different components. Words such as "including" or "comprising" imply that the elements or objects preceding the word cover the elements or objects listed after the word and their equivalents, without excluding other elements or objects. Words such as "connected" or "coupled" are not limited to physical or mechanical connections, but may include electrical connections, whether direct or indirect. Additionally, unless specifically indicated in the subsequent text of the embodiments of the disclosure, the quantity of a component or element implies that the component or element may be one or more, or understood to be at least one. "At least one" refers to one or more, while "multiple" refers to at least two.

It should be noted that the transistors used in the embodiments of the disclosure can be thin film transistors, field-effect transistors, or other switch devices with similar characteristics. Since the source electrode and drain electrode of a transistor are symmetrical, there is no distinction in structure, and they can be interchangeable. In the embodiments of the disclosure, to distinguish between the source electrode and drain electrode of the transistor, one of the source electrode and drain electrode is referred to as the first electrode, and the other as the second electrode. In addition, according to the characteristics of the transistor, the transistor can be divided into N-type transistors and P-type transistors; when N-type transistors are used, the gate input is high, and the first and second electrodes are conductive; when P-type transistors are used, the gate input is low, and the first and second electrode are conductive. The following embodiments are described with reference to N-type transistors, but the embodiments of the disclosure include but are not limited to this, and P-type transistors can also be used in the embodiments of the disclosure. It can be understood that it is easy for those skilled in the art in this field to conceive of replacing N-type transistors with P-type transistors without inventive labor, and therefore, it is also within the scope of protection of the embodiments of the disclosure.

GOA circuits can adopt bilateral driving mode (head to head driving) and odd-even interlace driving mode; bilateral driving mode refers to setting two shift registers on both sides of the same pixel row to provide gate driving signals to the pixel row from both ends of the pixel row; odd-even interlace driving mode refers to setting one shift register on one side of the same pixel row, so that the pixel row is provided with gate driving signals from one side of the pixel row, and the shift registers corresponding to odd pixel rows are located on one side, and the shift registers corresponding to even pixel rows are located on the other side.

Typically, small-sized display devices (e.g., smartphones) and low refresh rate medium-sized display devices (e.g., tablets) adopt odd-even interlace driving mode due to smaller loads on gate lines; whereas medium-sized and large-sized display devices with high refresh rates (e.g., monitors and televisions) adopt bilateral driving mode due to larger loads on gate driving signal lines. This is because, for small-sized panels, the gate driving signal line load is small, resulting in smaller wave form delay of the gate driving signal, thus the rise and falling times of the gate driving signal are smaller, therefore, adopting odd-even interlace driving mode satisfies general requirements, and even high refresh rate requirements; on the other hand, for large-sized panels, due to the larger load of gate lines, the waveform delay of the gate driving signal is larger, and it is difficult to achieve high refresh rates if odd-even interlace driving mode is adopted.

Specifically, FIG. 1 illustrates a schematic diagram of the cooperation between gate driving signals and data driving signals. As shown in FIG. 1, the data driving signal has a certain lag relative to the gate driving signal, i.e., the cross-trigger time t2 in FIG. 1. It is generally required that the cross-trigger time t2 is greater than or equal to the maximum value of the gate driving signal falling time, i.e., the maximum value of the gate driving signal falling time at various positions (near end, middle, far end, etc.) on the gate line. t3 is a unit time determined by factors such as the resolution and refresh rate of the display substrate. The higher the resolution and refresh rate of the display substrate, the smaller the unit time t3. When the unit time t3 is a fixed value, i.e., when the resolution and refresh rate of the display substrate are determined, t1 is the charging time, the longer the charging time t1, the higher the charging rate. If the charging rate is insufficient, the display substrate will have display abnormalities.

As shown in FIG. 1, the charging time t1=unit time t3−cross-trigger time t2, i.e., t1=t3−t2. It can be seen that, to ensure the charging rate, the charging time t1 should be as long as possible. Therefore, in high-resolution and high-refresh-rate display substrates, the falling time of the gate driving signal should be as short as possible, which can make the cross-trigger time t2 smaller and the charging time t1 larger. If a GOA circuit with bilateral driving mode is adopted, the load of the gate signal line is driven by shift registers on both the left and right sides, halving the load of a single shift register, thereby reducing the falling time of the gate driving signal; while if a GOA circuit with odd-even interlace driving mode is adopted, the load of the gate signal line is driven by a single shift register, leading to a larger falling time of the gate driving signal. Therefore, if a large-sized display device adopts a GOA circuit with odd-even interlace driving mode, it is generally difficult to achieve high refresh rates.

Figure 2:
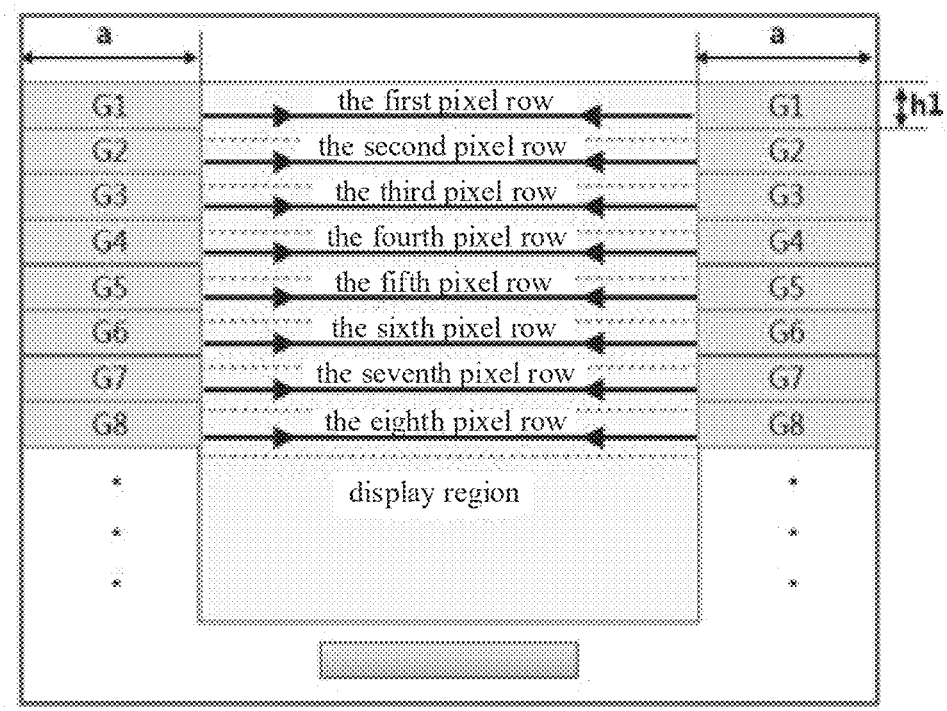
FIG. 2 illustrates a schematic diagram of a display substrate using a dual-side driving method of GOA.
Figure 3:
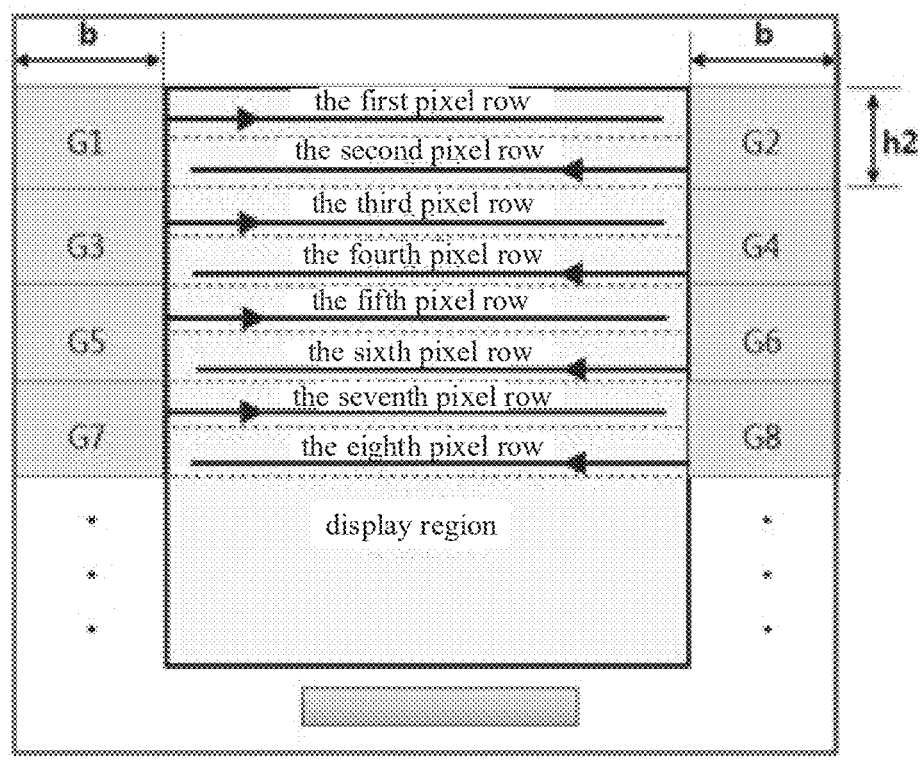
FIG. 3 illustrates a schematic diagram of a display substrate using an odd-even interlace driving method of GOA.

FIG. 2 shows a schematic diagram of a display substrate using bilateral driving mode GOA; FIG. 3 shows a schematic diagram of a display substrate using odd-even interlace driving mode GOA. As shown in FIGS. 2 and 3, each pixel row in FIG. 2 is driven simultaneously by two shift registers located on the left and right sides; for example, the first pixel row is driven simultaneously by two shift registers G1 located on the left and right sides of the first pixel row, the second pixel row is driven simultaneously by two shift registers G2 located on the left and right sides of the second pixel row, and so on; at this time, the height occupied by each shift register G is roughly equivalent to the height of a pixel, and the width occupied by the shift register is a, and the height is h1, the width occupied by the shift register a can be regarded as the minimum value of the border required by the display substrate. In FIG. 3, each pixel row is driven by a single shift register using odd-even interlace driving mode; for example, the first shift register (located on the left side) drives the first pixel row, the third shift register (located on the left side) drives the third pixel row, and so on, while the second shift register (located on the right side) drives the second pixel row, the fourth shift register (located on the right side) drives the fourth pixel row, and so on; at this time, the height occupied by each shift register, denoted as h2, is approximately equal to the height of two pixels, and the width occupied by the shift register is denoted as b, which can be considered as the minimum value of the border required by the display substrate. It can be seen that, with a similar area requirement for both types of shift registers, the display substrate employing odd-even interlace driving mode GOA shown in FIG. 3 can significantly reduce the width of the corresponding shift registers, i.e., b<a, thereby reducing the required border width. Therefore, the odd-even interlace driving mode GOA circuit not only reduces the number of shift registers, thus having lower costs, but also decreases the border width, thereby offering greater application value.

Figure 4:
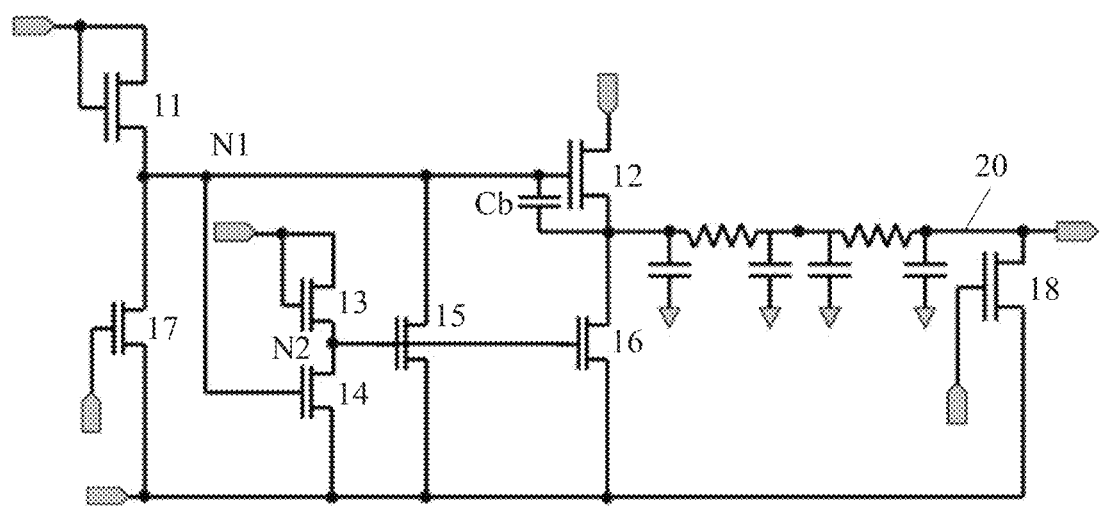
FIG. 4 illustrates a schematic diagram of shift registers in a display substrate.

FIG. 4 illustrates a schematic diagram of shift registers in a display substrate. As shown in FIG. 4, the shift register 10 comprises an input transistor 11, an output transistor 12, a first control transistor 13, a second control transistor 14, a first noise reduction transistor 15, a second noise reduction transistor 16, a reset transistor 17, and a bootstrap capacitor Cb; the second electrode of the input transistor 11 and the gate electrode of the output transistor 12 are connected to the first node N1; the first electrode and gate electrode of the input transistor 11 are connected to a pull-up signal; the first electrode of the output transistor 12 is connected to the clock signal; the gate electrode and the first electrode of the first control transistor 13 are connected to a high voltage, the second electrode of the first control transistor 13 and the second electrode of the second control transistor 14 are connect to the second node N2; the gate electrode of the first noise reduction transistor 15 and the gate electrode of the second noise reduction transistor 16 are connected to the second node N2, the first electrodes of the first noise reduction transistor 15 and the second noise reduction transistor 16 are connected to a low voltage, the second electrode of the first noise reduction transistor 15 is connected to the first node N1, and the second electrode of the second noise reduction transistor 16 is connected to the second electrode of the output transistor 12; one end of the bootstrap capacitor Cb is connected to the first node N1, and the other end is connected to the second electrode of the output transistor 12.

As shown in FIG. 4, the second electrode of the output transistor 12 is connected to one end of the gate line 20; the shift register 10 further comprises a pull-down transistor 18, the output terminal of the pull-down transistor 18 is connected to the other end of the gate line 20. The display substrate can reduce the falling time of the gate driving signal on the gate line 20 by using the output transistor 12 and the pull-down transistor 18 from both ends of the gate line 20. However, the pull-down transistor 18 can only pull down the gate driving signal at the far end (relative to the output end of the shift register) of the gate line 20, reducing the falling time of the gate driving signal at the far end of the gate line 20, while the output transistor 12 can to some extent reduce the falling time of the gate driving signal at the near end of the gate line 20, but as the width to length ratio of the output transistor 12 increases, the parasitic capacitance of the output transistor 12 increases, resulting in saturation of its effect on reducing the falling time of the gate driving signal and being not able to further reduce the falling time.

Figure 5:
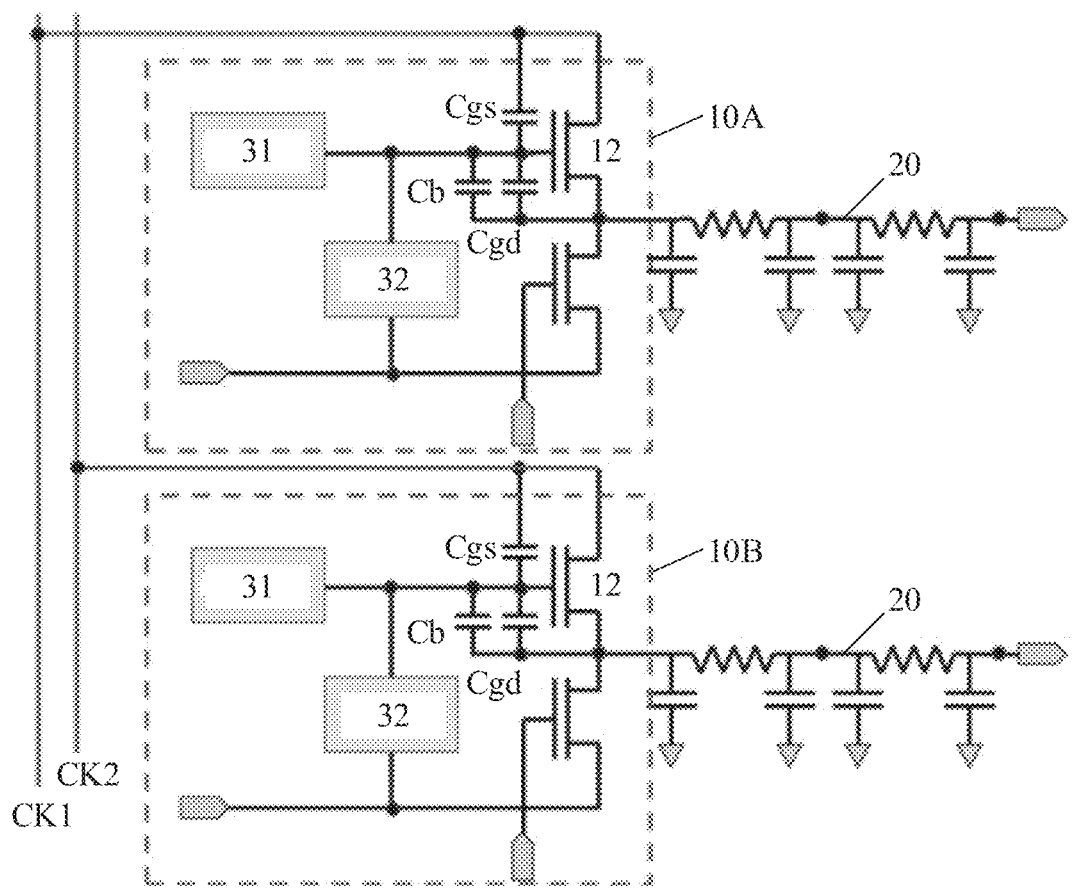
FIG. 5 depicts a schematic diagram of a GOA circuit.

FIG. 5 shows a schematic diagram of a GOA circuit. As shown in FIG. 5, the GOA circuit includes several shift registers, including the first shift register 10A and the second shift register 10B; the input terminal of the output transistor 12 of the first shift register 10A is connected to the first clock signal line CK1, and the input terminal of the output transistor 12 of the second shift register 10B is connected to the second clock signal line CK2. With this setup, the parasitic capacitance Cgs of the output transistor 12 will be loaded on the clock signal line; as the width to length ratio of the output transistor 12 increases, its on-state current will increase, thereby reducing the falling time of the gate driving signal at the near end of the gate line 20. However, the parasitic capacitance Cgs of the output transistor 12 will also increase, and the load on the clock signal line will also increase. Therefore, as the output transistor 12 increases, the falling time of the gate driving signal will first decrease and then reach saturation, and further increase of the width to length ratio of the output transistor 12 will not further reduce the falling time of the gate driving signal. It can be seen that the falling time of the gate driving signal at the near end of the gate line will reach a certain limit and cannot continue to decrease, while the falling time of the gate driving signal at the far end of the gate line can continue to decrease as the width to length ratio of the pull-down transistor increases, ultimately resulting in the falling time of the gate driving signal at the far end of the gate line being much smaller than that at the near end of the gate line. On the one hand, this will cause a significant difference in feed-through voltage between the near and far ends of the pixel row, posing a risk of display defects to display substrates using single-side driving mode GOA circuits; on the other hand, as mentioned above, the cross-trigger time t2 is determined by the maximum value of the falling time of the gate driving signal at various positions on the gate line, so unilaterally reducing the falling time of the gate driving signal at the far end of the gate line is ineffective. It should be noted that the input module 31 in FIG. 5 may include the aforementioned input transistor M1, and the sustaining module 32 in FIG. 5 may include the aforementioned first control transistor 13, the second control transistor 14, the first noise reduction transistor 15, and the second noise reduction transistor 16.

In this regard, an embodiment of the disclosure provides a display substrate and a display device. The display substrate comprises a substrate and includes a shift register, a clock signal line, and a first power voltage line disposed on the substrate. The clock signal line is configured to provide a clock signal to the shift register, and the first power voltage line is configured to provide a first power voltage to the shift register. The shift register comprises an input circuit, an output circuit, and a first output pull-down circuit. The input circuit includes a control terminal, an input terminal, and an output terminal, while the output circuit includes a control terminal, an input terminal, and an output terminal. The output terminal of the input circuit and the control terminal of the output circuit are connected to a first node, and the input terminal of the output circuit is connected to the clock signal line. The input circuit is configured to respond to a first driving signal on the control terminal of the input circuit to write an input signal on the input terminal of the input circuit into the first node, and the output circuit is configured to respond to a signal on the first node to output the clock signal on the clock signal line through the output terminal of the output circuit as a gate driving signal. The first output pull-down circuit comprises a control terminal, an input terminal, and an output terminal, with the input terminal of the first output pull-down circuit connected to the first power voltage line, and the output terminal of the first output pull-down circuit connected to the output terminal of the output circuit. The first output pull-down circuit is configured to respond to a second driving signal on the control terminal of the first output pull-down circuit to reduce the falling time of the gate driving signal at the output terminal of the output circuit by the first power voltage. Thus, the display substrate can further reduce costs and decrease the border width for adopting an odd-even interlace driving mode of the GOA circuit while ensuring a higher resolution and refresh rate by reducing the falling time of the gate driving signal outputted by a single shift register, thereby making the product more competitive in the market.

Below is a detailed description of the display substrate and display device provided in the embodiments of the present disclosure, in conjunction with the accompanying drawings.

Figure 6:
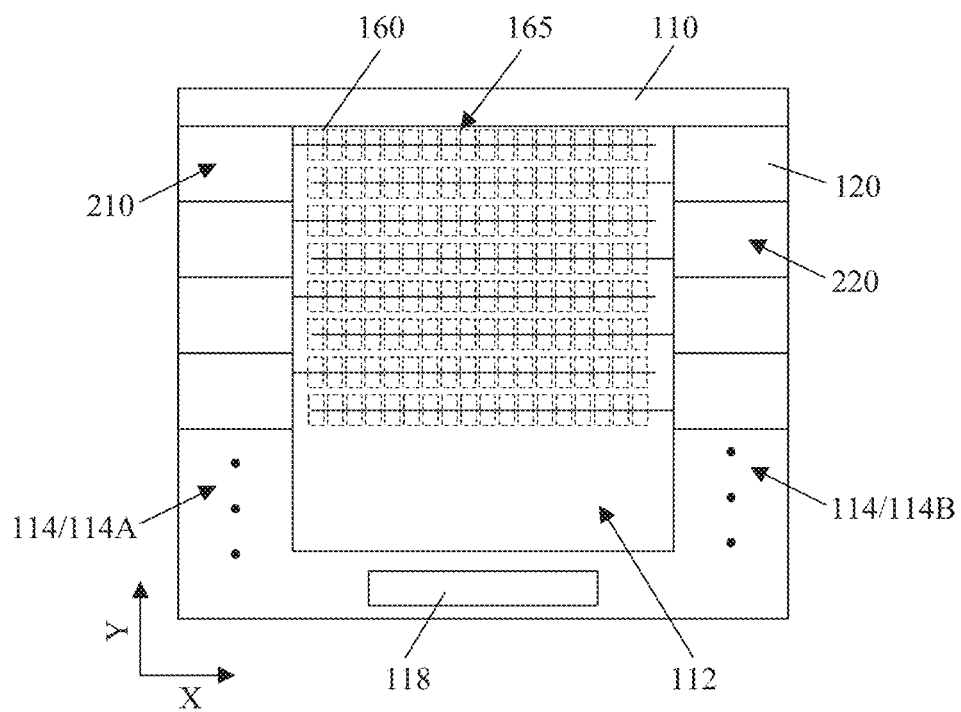
FIG. 6 illustrates a schematic diagram of a display substrate provided in an embodiment of the disclosure.
Figure 7:
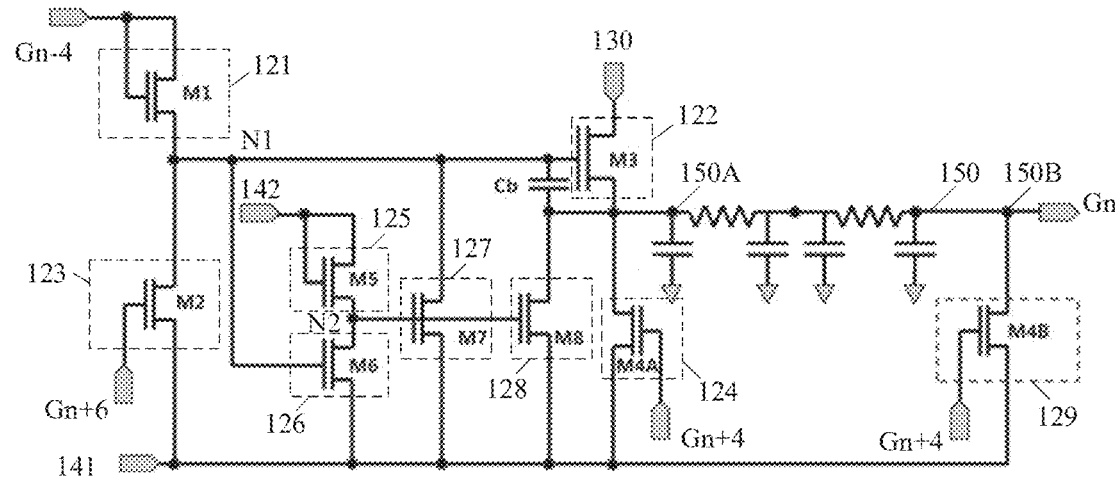
FIG. 7 illustrates a schematic diagram of shift registers in a display substrate provided in an embodiment of the disclosure.

An embodiment of the present disclosure provides a display substrate. FIG. 6 is a schematic diagram of a display substrate provided in an embodiment of the present disclosure; FIG. 7 is a schematic diagram of a shift register provided in an embodiment of the present disclosure.

As shown in FIGS. 6 and 7, the display substrate 100 comprises a substrate 110 and includes a shift register 120, a clock signal line 130, and a first power voltage line 141 disposed on the substrate 110. The clock signal line 130 is configured to provide a clock signal to the shift register 120, and the first power voltage line 141 is configured to provide a first power voltage to the shift register 120. The shift register 120 comprises an input circuit 121, an output circuit 122, and a first output pull-down circuit 124. The input circuit 121 includes a control terminal, an input terminal, and an output terminal, while the output circuit 122 includes a control terminal, an input terminal, and an output terminal. The output terminal of the input circuit 121 and the control terminal of the output circuit 122 are connected to the first node N1, and the input terminal of the output circuit 122 is connected to the clock signal line 130. The input circuit 121 is configured to respond to a first driving signal on the control terminal of the input circuit 121 to write an input signal on the input terminal of the input circuit 121 into the first node N1, and the output circuit 122 is configured to respond to a signal on the first node N1 to output the clock signal on the clock signal line 130 through the output terminal of the output circuit 122 as a gate driving signal.

The first output pull-down circuit 124 comprises a control terminal, an input terminal, and an output terminal. The input terminal of the first output pull-down circuit 124 is connected to the first power voltage line 141, and the output terminal of the first output pull-down circuit 124 is connected to the output terminal of the output circuit 122. The first output pull-down circuit 124 is configured to respond to a second driving signal on the control terminal of the first output pull-down circuit 124 to reduce the falling time of the gate driving signal at the output terminal of the output circuit 122 by the first power voltage, with the rising edge of the second driving signal overlapping in time with the falling edge of the gate driving signal. It should be noted that the input and output terminals of the aforementioned circuits are merely examples of signal input and output and are not limited to the actual direction of current flow; the input and output terminals of each circuit can be interchanged.

In the display substrate provided in this disclosed embodiment, the shift register can reduce the falling time of the gate driving signal at the output terminal of the output circuit through the first output pull-down circuit. This can decrease the falling time of the gate driving signal at the proximal end of the gate line corresponding to this shift register, thereby reducing the cross-trigger time (cross-trigger time t2 determined by the maximum falling time of the gate driving signal at various positions on the gate line) and increasing the charging time. Thus, the display substrate can further reduce costs and decrease the border width by adopting an odd-even interlace driving mode of the GOA circuit while maintaining a high resolution and refresh rate (suitable for large-size products), making the product more competitive in the market.

In some examples, as shown in FIG. 7, the display substrate 100 further includes gate lines 150 and multiple pixel rows 165. Each of the gate lines 150 extend along the first direction X, and multiple pixel rows 165 are arranged along the second direction Y intersecting with the first direction X. Each pixel row 165 comprises multiple pixel units 160 arranged along the first direction. The gate lines 150 are connected to multiple pixel units 160 in the pixel rows 165 and provide gate driving signals to them. Each of the gate lines 150 includes a first end 150A and a second end 150B located on both sides of the pixel rows 165. The first end 150A of the gate lines 150 is connected to the output terminal of the output circuit 122. The shift register 120 further includes a second output pull-down circuit 129, comprising a control terminal, an input terminal, and an output terminal. The input terminal of the second output pull-down circuit 129 is connected to the first power voltage line 141, and the second end 150B of the gate lines 150 is connected to the output terminal of the second output pull-down circuit 129. The second output pull-down circuit 129 is configured to respond to a third driving signal on the control terminal of the second output pull-down circuit 129 to reduce the falling time of the gate driving signal at the second end 150B through the first power voltage.

In this display substrate, the shift register can reduce the falling time of the gate driving signal at both ends of the gate lines, namely the near end (first end) and the far end (second end) with respect to the output circuit, through the first and second output pull-down circuits respectively. This reduction in falling time of the gate driving signal at various positions along the gate lines decreases the cross-trigger time of multiple pixel units corresponding to the gate line while increasing the charging time. Consequently, the display substrate can further reduce costs and decrease the border width by adopting an odd-even interlace driving mode of the GOA circuit while maintaining a high resolution and refresh rate (suitable for large-size products), making the product more competitive in the market.

In some examples, as shown in FIG. 7, the control terminal of the first output pull-down circuit 124 and the control terminal of the second output pull-down circuit 129 are connected to the same signal line Gn+4, namely, the second driving signal and the third driving signal are the same. Consequently, the display substrate can synchronously reduce the falling time of the gate driving signal at both the near end (first end) near the output circuit and the far end (second end) away from the output circuit of the gate line through the first and second output pull-down circuits. It should be noted that the signal line Gn+4 mentioned above can be the gate driving signal output from the (n+4)th shift register.

Figure 8:
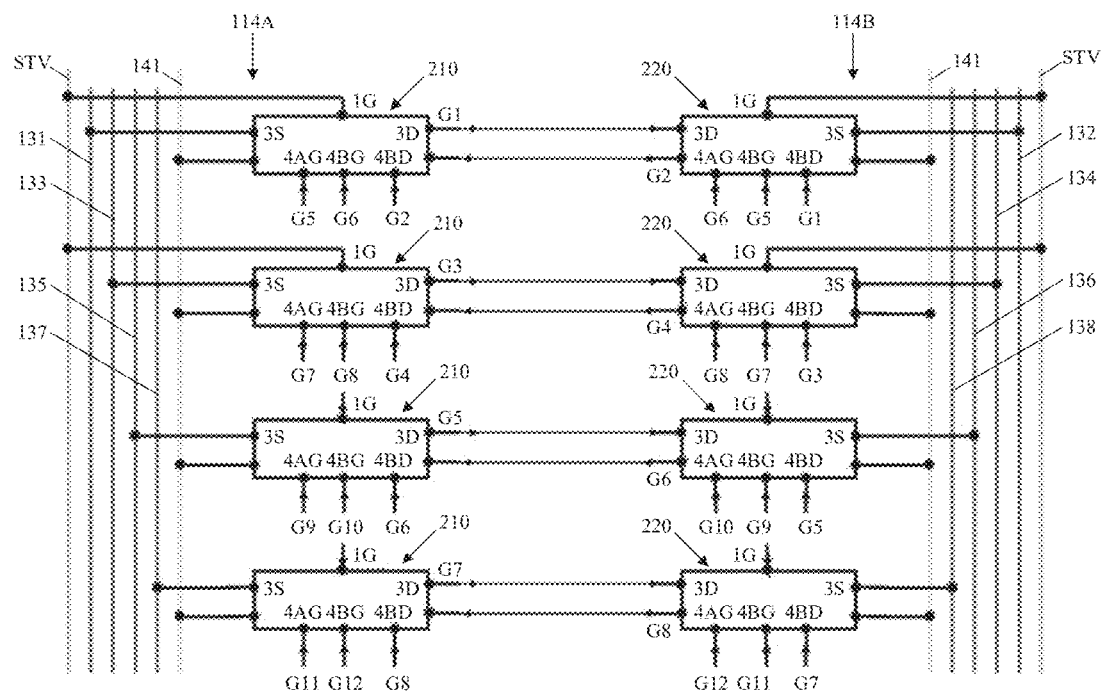
FIG. 8 illustrates a schematic diagram of cascaded shift registers in a display substrate provided in an embodiment of the disclosure.
Figure 9:
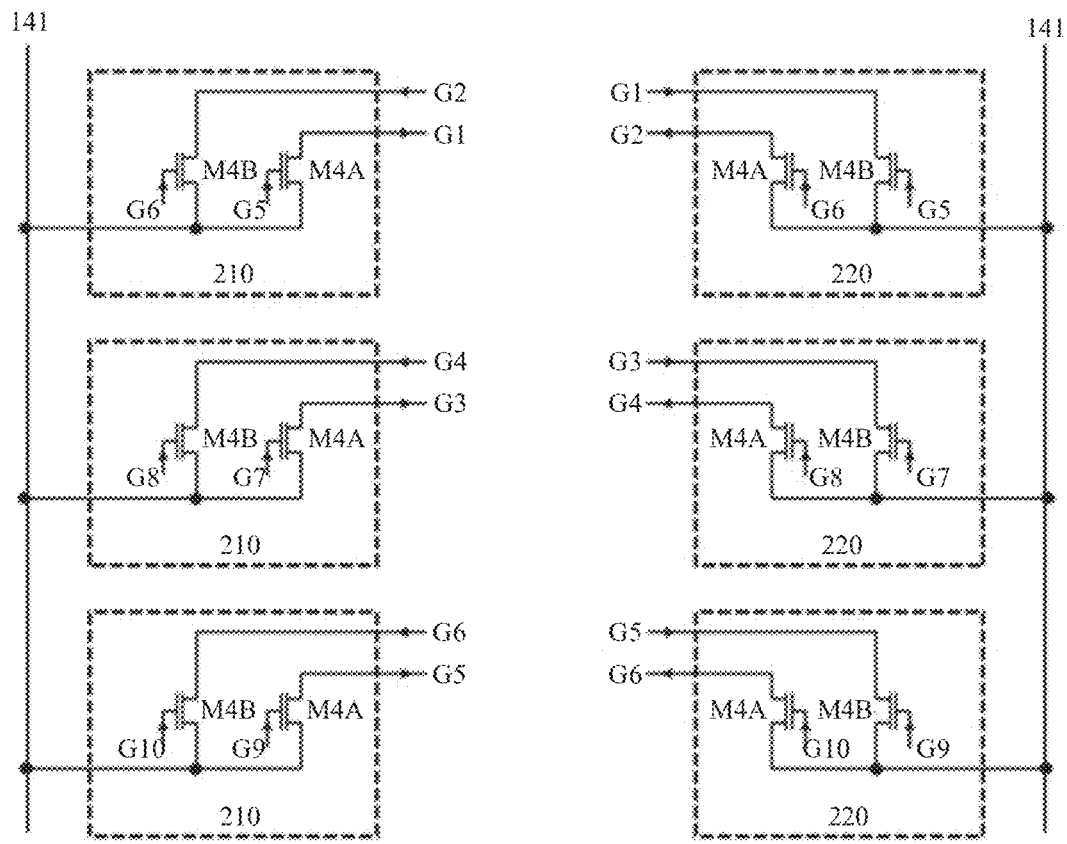
FIG. 9 illustrates a schematic diagram of cascaded shift registers in another display substrate provided in an embodiment of the disclosure.

FIG. 8 illustrates a schematic diagram of cascaded shift registers in a display substrate according to an embodiment of the disclosure; FIG. 9 illustrates another schematic diagram of cascaded shift registers in a display substrate according to an embodiment of the disclosure. In FIG. 8, only partial terminals of the input circuit, output circuit, first output pull-down circuit, and second output pull-down circuit of each shift register are shown. Wherein 1G represents the control terminal of the input circuit 121, 3S represents the input terminal of the output circuit, 3D represents the output terminal of the output circuit, 4AG represents the control terminal of the first output pull-down circuit, 4BG represents the control terminal of the second output pull-down circuit, and 4BD represents the output terminal of the second output pull-down circuit. In FIG. 9, only partial terminals of the first output pull-down circuit and the second output pull-down circuit are shown, wherein M4A represents the first output pull-down circuit, and M4B represents the second output pull-down circuit.

In some examples, as shown in FIGS. 6, 7, 8, and 9, the substrate 110 includes a display area 112 and a peripheral area 114, wherein the peripheral area 114 includes a first sub-peripheral area 114A and a second sub-peripheral area 114B located on both sides of the display area 112; for example, the first sub-peripheral area 114A and the second sub-peripheral area 114B are located on the left and right sides of the display area 112, respectively. The input circuit 121, output circuit 122, and first output pull-down circuit 124 of the shift register 120 are located in one of the first sub-peripheral area 114A and the second sub-peripheral area 114B, and the second output pull-down circuit 129 of the shift register 120 is located in the other of the first sub-peripheral area 114A and the second sub-peripheral area 114B. Consequently, this display substrate employs an odd-even interlace driving mode of the GOA circuit to further reduce costs and decrease border width.

For example, as shown in FIG. 6, the peripheral area 114 of the substrate 110 may further include a bonding area 118 located below the display area 112 for bonding with an external driving IC.

For example, as shown in FIGS. 8 and 9, the input circuit, output circuit, and first output pull-down circuit of the first shift register 120 are located in the first sub-peripheral area 114A, and the second output pull-down circuit of the first shift register 120 is located in the second sub-peripheral area 114B; the input circuit, output circuit, and first output pull-down circuit of the second shift register 120 are located in the second sub-peripheral area 114B, and the second output pull-down circuit of the second shift register 120 is located in the first sub-peripheral area 114A; the input circuit, output circuit, and first output pull-down circuit of the third shift register 120 are located in the first sub-peripheral area 114A, and the second output pull-down circuit of the third shift register 120 is located in the second sub-peripheral area 114B; the input circuit, output circuit, and first output pull-down circuit of the fourth shift register 120 are located in the second sub-peripheral area 114B, and the second output pull-down circuit of the fourth shift register 120 is located in the first sub-peripheral area 114A; and so on.

In some examples, as shown in FIGS. 6, 7, 8, and 9, the display substrate 100 includes M shift registers 120 and M gate lines 150, where each of the M shift registers 120 provides gate driving signals to each of the M gate lines 150. The ith shift register 120 provides gate driving signals to the ith gate line 150, where i is an integer greater than or equal to 1 and less than or equal to M; the (2n+1)th shift register 120 is located in the first sub-peripheral area 114A, and the (2n+2)th shift register 120 is located in the second sub-peripheral area 114B, where n is an integer greater than or equal to 0. Consequently, the display substrate can set the shift registers corresponding to odd-numbered rows of gate lines in the first sub-peripheral area and the shift registers corresponding to even-numbered rows of gate lines in the second sub-peripheral area, thereby realizing an odd-even interlace driving mode.

In some examples, as shown in FIGS. 6, 7, 8, and 9, the first sub-peripheral area 114A includes the first register region 210 and the (2j+1)th register region 210, and the second sub-peripheral area 114B includes the second register region 220 and the (2j+2)th register region 220. The first register region 210 and the second register region 220 are arranged to be opposite to and spaced apart from each other, as are the (2j+1)th register region 210 and the (2j+2)th register region 220. The first register region 210 is provided with the input circuit 121, output circuit 122, and the first output pull-down circuit 124 of the first shift register 120, along with the second output pull-down circuit 129 of the second shift register 120. The second register region 220 is provided with the input circuit 121, output circuit 122, and the first output pull-down circuit 124 of the second shift register 120, along with the second output pull-down circuit 129 of the first shift register 120. The (2j+1)th register region 210 is provided with the input circuit 121, output circuit 122, and the first output pull-down circuit 124 of the (2j+1)th shift register 120, along with the second output pull-down circuit 129 of the (2j+2)th shift register 120, while the (2j+2)th register region 220 is provided with the input circuit 121, output circuit 122, and the first output pull-down circuit 124 of the (2j+2)th shift register 120, along with the second output pull-down circuit 129 of the (2j+1)th shift register 120, where j is a positive integer greater than or equal to 1. Thus, the display substrate cleverly utilizes the area of the peripheral region to enhance integration while allowing each shift register to reduce the falling time of the gate driving signal at both ends of the corresponding gate line.

In some examples, as shown in FIGS. 6 and 7, the control terminal of the first output pull-down circuit 124 of the mth shift register 120 is electrically connected to the output terminal of the output circuit 122 of the (m+k)th shift register 120, where m is a positive integer greater than or equal to 1, and k is a positive integer greater than or equal to 1. This means that the first output pull-down circuit of the mth shift register can be controlled by the output signal of subsequent shift register. On the one hand, this can save driving lines, and on the other hand, it can enhance integration.

In some examples, as shown in FIGS. 6 and 7, the display substrate 100 includes p clock signal lines 130, where k=p/2, thereby satisfying the overlap of the falling edge of the gate driving signal and the rising edge of the second driving signal.

In some examples, as shown in FIGS. 6 and 7, the control terminal of the second output pull-down circuit 129 of the mth shift register 120 is electrically connected to the output terminal of the output circuit 122 of the (m+k)th shift register 120. This means that the second output pull-down circuit of the mth shift register can be controlled by the output signal of subsequent shift register. This can save driving lines on one hand and enhance integration on the other hand.

In some examples, as shown in FIGS. 6 and 7, both the control terminal of the first output pull-down circuit 124 and the control terminal of the second output pull-down circuit 129 of the mth shift register 120 are electrically connected to the output terminal 122 of the (m+k)th shift register 120.

In some examples, as shown in FIGS. 6 and 7, when m is odd, the control terminal of the first output pull-down circuit 124 and the control terminal of the second output pull-down circuit 129 of the mth shift register 120 are both electrically connected to the output terminal of the output circuit 122 of the shift register 120 with an odd ordinal number; when m is even, the control terminal of the first output pull-down circuit 124 and the control terminal of the second output pull-down circuit 129 of the mth shift register 120 are both electrically connected to the output terminal of the output circuit 122 of the shift register 120 with an even ordinal number. This configuration allows the display substrate to be better wired, enhancing integration.

In some examples, as shown in FIGS. 6 and 7, in the shift register 120, the input circuit 121 includes an input transistor M1, the output circuit 122 includes an output transistor M3, and the first output pull-down circuit 124 includes a first pull-down transistor M4A; the input transistor M1 comprises a gate electrode, a first electrode, and a second electrode, the output transistor M3 comprises a gate electrode, a first electrode, and a second electrode, and the first pull-down transistor M4A comprises a gate electrode, a first electrode, and a second electrode; the second electrode of the input transistor M1 and the gate electrode of the output transistor M3 are connected to the first node N1, the first electrode of the output transistor M3 is connected to the clock signal line 130, the first electrode of the first pull-down transistor M4A is connected to the first power supply voltage line 141, and the second electrode of the first pull-down transistor M4A is connected to the second electrode of the output transistor M3.

In some examples, as shown in FIGS. 6 and 7, the second output pull-down circuit 129 includes a second pull-down transistor M4B, comprising a gate electrode, a first electrode, and a second electrode; the first electrode of the second pull-down transistor M4B is connected to the first power supply voltage line 141, and the second electrode of the second pull-down transistor M4B is connected to the second end of the gate line 150.

In some examples, as shown in FIGS. 6 and 7, the shift register 120 further includes a bootstrap capacitor Cb; one end of the bootstrap capacitor Cb is connected to the first node N1, and the other end of the bootstrap capacitor Cb is connected to the output terminal of the output transistor M3.

In some examples, as shown in FIGS. 8 and 9, the input terminal 3S of the output transistor M3 of the first shift register 120 is connected to the first clock signal line 131, the output terminal 3D of the output transistor M3 of the first shift register 120 outputs gate driving signal G1, the gate electrode 4AG of the first pull-down transistor M4A of the first shift register 120 is connected to the output terminal of the fifth shift register 120 to receive gate driving signal G5; the second pull-down transistor M4B of the second shift register 120 is disposed in the first register region 210, the gate electrode 4BG of the second pull-down transistor M4B of the second shift register 120 is connected to the output terminal of the sixth shift register 120 to receive gate driving signal G6, and the drain 4BD of the second pull-down transistor M4B of the second shift register 120 is connected to the output terminal of the second shift register 120 to reduce the falling time of the gate driving signal at the far end of the second shift register 120.

In some examples, as shown in FIGS. 8 and 9, the input terminal 3S of the output transistor M3 of the second shift register 120 is connected to the second clock signal line 132. The output terminal 3D of the output transistor M3 of the second shift register 120 outputs gate driving signal G2. The gate electrode 4AG of the first pull-down transistor M4A of the second shift register 120 is connected to the output terminal of the sixth shift register 120 to receive gate driving signal G6. The second pull-down transistor M4B of the first shift register 120 is disposed in the second register area 220. The gate electrode 4BG of the second pull-down transistor M4B of the first shift register 120 is connected to the output terminal of the fifth shift register 120 to receive gate driving signal G5. The drain electrode 4BD of the second pull-down transistor M4B of the first shift register 120 is connected to the output terminal of the first shift register 120 to reduce the falling time of the gate driving signal at the far end of the first shift register 120.

In some examples, as illustrated in FIGS. 8 and 9, the input terminal 3S of the output transistor M3 of the third shift register 120 is connected to the first clock signal line 131. The output terminal 3D of the output transistor M3 of the third shift register 120 outputs gate driving signal G1. The gate electrode 4AG of the first pull-down transistor M4A of the third shift register 120 is connected to the output terminal of the seventh shift register 120 to receive gate driving signal G7. The second pull-down transistor M4B of the fourth shift register 120 is disposed in the first register area 210. The gate electrode 4BG of the second pull-down transistor M4B of the fourth shift register 120 is connected to the output terminal of the eighth shift register 120 to receive gate driving signal G8. The drain electrode 4BD of the second pull-down transistor M4B of the fourth shift register 120 is connected to the output terminal of the fourth shift register 120 to reduce the falling time of the gate driving signal at the far end of the fourth shift register 120.

In some examples, as depicted in FIGS. 8 and 9, the input terminal 3S of the output transistor M3 of the fourth shift register 120 is connected to the second clock signal line 132. The output terminal 3D of the output transistor M3 of the fourth shift register 120 outputs gate driving signal G2. The gate electrode 4AG of the first pull-down transistor M4A of the fourth shift register 120 is connected to the output terminal of the eighth shift register 120 to receive gate driving signal G8. The second pull-down transistor M4B of the third shift register 120 is disposed in the second register area 220. The gate electrode 4BG of the second pull-down transistor M4B of the third shift register 120 is connected to the output terminal of the seventh shift register 120 to receive gate driving signal G7. The drain electrode 4BD of the second pull-down transistor M4B of the third shift register 120 is connected to the output terminal of the third shift register 120 to reduce the falling time of the gate driving signal at the far end of the third shift register 120.

It should be noted that the cascading of the shift registers from the first shift register to the fourth shift register has been described above. Therefore, the shift registers provided in the embodiments of the disclosure can be cascaded according to the relevant description provided in FIGS. 8 and 9 and the above, and will not be further described here.

Figure 10:
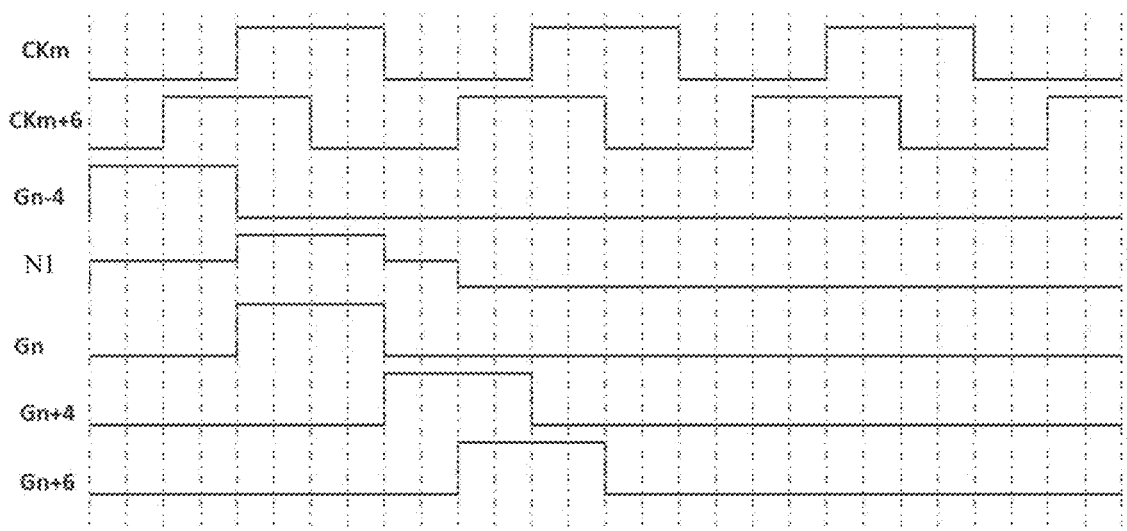
FIG. 10 illustrates a timing diagram of shift registers in a display substrate provided in an embodiment of the disclosure.

FIG. 10 illustrates a timing diagram of shift registers in a display substrate according to an embodiment provided herein. As shown in FIG. 10, during the input stage, the input transistor M1 responds to the driving signal on its gate electrode, writing the signal input to its first electrode into the first node N1, while simultaneously charging the bootstrap capacitor Cb. During the output stage, the output transistor M3 is configured to respond to the signal on the first node N1 to output the clock signal on the clock signal line 130 through the output terminal of the output transistor M3 as the gate driving signal. As the gate driving signal begins to fall, the first pull-down transistor M4A and the second pull-down transistor M4B are turned on to reduce the falling time of the gate driving signal from both ends (far end and near end) of the gate line using the first power voltage. It should be noted that CKm represents the clock signal line connected to the output circuit of the mth shift register, and CKm+6 represents the clock signal line connected to the output circuit of the (m+6)th shift register.

In some examples, as illustrated in FIGS. 6 and 7, the shift register 120 further comprises a first control circuit 125, a second control circuit 126, a first noise reduction circuit 127, and a second noise reduction circuit 128. The output terminals of the first control circuit 125 and the second control circuit 126 are connected to the second node N2. The control terminal and input terminal of the first control circuit 125 are connected to the second power voltage line 142, while the input terminal of the second control circuit 126 is connected to the first power voltage line 141, configured to receive the first power voltage. The control terminal of the second control circuit 126 is connected to the first node N1. The first control circuit 125 is configured to respond to the second power voltage on the second power voltage line 142 and pull up the potential of the second node N2 by the second power voltage. The second control circuit 126 is configured to respond to the signal on the first node N1 and pull down the potential of the second node N2 by the first power voltage. The control terminals of the first noise reduction circuit 127 and the second noise reduction circuit 128 are connected to the second node N2. The input terminals of the first noise reduction circuit 127 and the second noise reduction circuit 128 are connected to the first power voltage line 141, configured to receive the first power voltage. The output terminal of the first noise reduction circuit 127 is connected to the first node N1, while the output terminal of the second noise reduction circuit 128 is connected to the output terminal of the output circuit 122. The first noise reduction circuit 127 is configured to respond to the signal on the second node N2 to reduce noise on the first node N1 by the first power voltage, and the second noise reduction circuit 128 is configured to respond to the signal on the second node N2 to reduce noise on the output terminal of the output circuit 122 by the first power voltage. It should be noted that the input terminals of the second control circuit, the first noise reduction circuit, and the second noise reduction circuit can also be connected to other signal lines loaded with the first power voltage to receive the first power voltage.

In some examples, as shown in FIGS. 6 and 7, the first control circuit 125 includes a first control transistor M5, the second control circuit 126 includes a second control transistor M6, the first noise reduction circuit 127 includes a first noise reduction transistor M7, and the second noise reduction circuit 128 includes a second noise reduction transistor M8. The first control transistor M5 comprises a gate electrode, a first electrode, and a second electrode. The second control transistor M6 comprises a gate electrode, a first electrode, and a second electrode. The first noise reduction transistor M7 comprises a gate electrode, a first electrode, and a second electrode. The second noise reduction transistor M8 comprises a gate electrode, a first electrode, and a second electrode. The first electrode and the gate electrode of the first control transistor M5 are connected to the second power voltage line 142. The second electrode of the first control transistor M5 is connected to the second electrode of the second control transistor M6, which is connected to the second node N2. The gate electrode of the second control transistor M6 is connected to the first node N1, and the first electrode of the second control transistor M6 is connected to the first power voltage line 141. The gate electrodes of the first noise reduction transistor M7 and the second noise reduction transistor M& are connected to the second node. The first electrode of the first noise reduction transistor M7 and the first electrode of the second noise reduction transistor M8 are connected to the first power voltage line 141. The second electrode of the first noise reduction transistor M7 is connected to the first node N1, and the second electrode of the second noise reduction transistor M8 is connected to the output terminal of the output circuit 122.

In some examples, as shown in FIG. 10, when the potential at the first node N1 is high, the second control transistor M6 is turned on. At this time, the first power voltage on the first power voltage line 141 can be written into the second node N2, keeping the second node N2 at a low level. When the potential at the first node N1 is low, the second control transistor M6 is not conducting, and the second power voltage on the second power voltage line 142 is written into the second node N2 via the first control transistor M5, causing the potential at the second node N2 to be pulled high. At this point, the first noise reduction transistor M7 and the second noise reduction transistor M8 are turned on. The first power voltage on the first power voltage line 141 is used to reduce noise on the potential at the first node N1 via the first noise reduction transistor M7, and to reduce noise on the potential at the output terminal of the output circuit 122 via the second noise reduction transistor M8.

In some examples, as shown in FIGS. 6 and 7, the shift register 120 further includes a reset circuit 123. The reset circuit 123 comprises a control terminal, an input terminal, and an output terminal. The control terminal of the reset circuit 123 is configured to respond to the fourth drive signal, clearing the signal at the first node N1 by the first power voltage.

In some examples, the fourth drive signal on the control terminal of the reset circuit 123 of the nth shift register 120 can be a signal from the output terminal of any one of the shift registers from the (n+k)th to the (n+p−1)th. In other words, the control terminal of the reset circuit 123 of the nth shift register 120 can be electrically connected to the output terminal of any one of the shift registers from the (n+k)th to the (n+p−1)th. This configuration saves drive lines and increases integration.

For example, as shown in FIG. 7, the fourth drive signal on the control terminal of the reset circuit 123 of the nth shift register 120 can be a signal from the output terminal of the (n+6)th shift register.

In some examples, as shown in FIGS. 6 and 7, the reset circuit 123 includes a reset transistor M2, comprising a gate electrode, a first electrode, and a second electrode. The first electrode of the reset transistor M2 is configured to receive the first power voltage, and the second electrode of the reset transistor M2 is connected to the first node N1.

Figure 11:
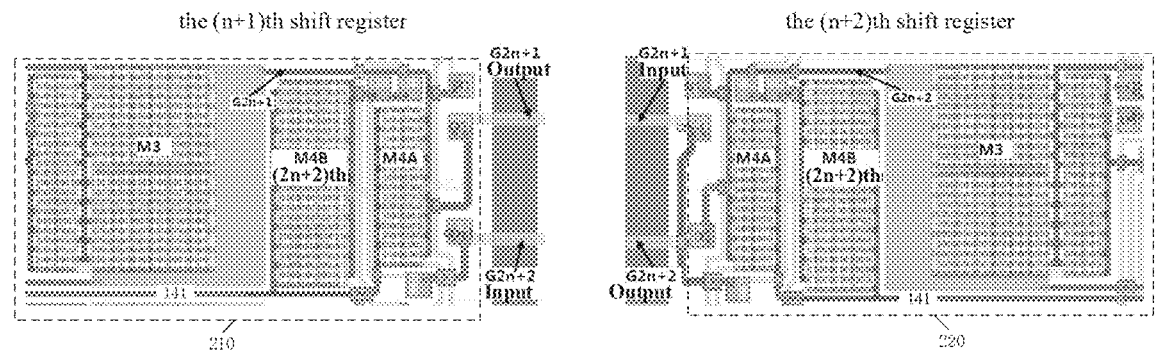
FIG. 11 illustrates a partial layout diagram of a display substrate provided in an embodiment of the disclosure.

FIG. 11 illustrates a partial layout diagram of a display substrate provided in an embodiment of the disclosure. As shown in FIG. 11, the (2n+1)th shift register 120 and the (2n+2)th shift register 120 are arranged to be opposite to and spaced apart from each other, with the (2n+1)th shift register 120 and the (2n+2)th shift register 120 positioned on opposite sides of the display area 112 and opposite to each other; where n is a positive integer greater than or equal to 0.

In some examples, as shown in FIG. 11, in the (2n+1)th shift register 120, an orthographic projection of the first pull-down transistor M4A on the substrate 110 is located on a side of an orthographic projection of the output transistor M3 on the substrate 110, closer to the (2n+2)th shift register 120; in the (2n+2)th shift register 120, an orthographic projection of the first pull-down transistor M4A on the substrate 110 is located on a side of an orthographic projection of the output transistor M3 on the substrate 110, closer to the (2n+1)th shift register 120.

In some examples, as shown in FIG. 11, an orthographic projection of the second pull-down transistor M4B of the (2n+1)th shift register 120 on the substrate 110 is located between an orthographic projection of the output transistor M3 of the (2n+2)th shift register 120 on the substrate 110 and an orthographic projection of the first pull-down transistor M4A of the (2n+2)th shift register 120 on the substrate 110; an orthographic projection of the second pull-down transistor M4B of the (2n+2)th shift register 120 on the substrate 110 is located between an orthographic projection of the output transistor M3 of the (2n+1)th shift register 120 on the substrate 110 and an orthographic projection of the first pull-down transistor M4A of the (2n+1)th shift register 120 on the substrate 110. Thus, this display substrate facilitates cascading between shift registers, increasing integration, and further reducing the width of the border.

Figure 12A:
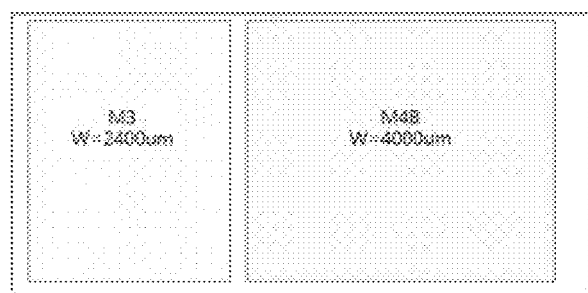
FIG. 12A depicts a size design diagram of shift registers in a display substrate.
Figure 12B:
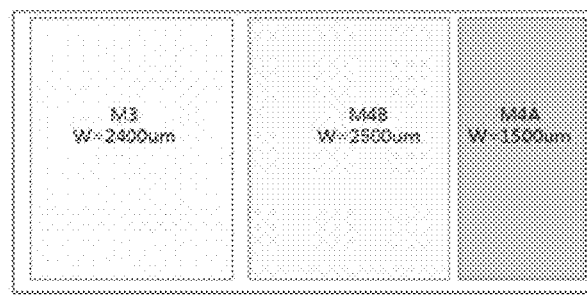
FIG. 12B depicts a size design diagram of shift registers in a display substrate provided in an embodiment of the disclosure.

FIG. 12A illustrates a dimensional design diagram of shift registers in a display substrate; FIG. 12B illustrates a dimensional design diagram of shift registers in an embodiment of the disclosure. The shift register shown in FIG. 12A includes only the second pull-down transistor M4B, i.e., the pull-down transistor at the far end of the gate line; the shift register shown in FIG. 12B includes both the first pull-down transistor M4A and the second pull-down transistor M4B.

As shown in FIGS. 12A and 12B, when the first power voltage is −10V and the second power voltage is 30V, the channel width of the output transistor M3 in FIG. 12A and FIG. 12B is 2400 micrometers. The channel width of the second pull-down transistor M4B in FIG. 12A is 4000 micrometers, and the channel width of the first pull-down transistor M4A in FIG. 12B is 1500 micrometers, while the channel width of the second pull-down transistor M4B is 2500 micrometers. It can be seen that although the shift register shown in FIG. 12B includes an additional transistor, the overall width of this shift register can remain the same or even decrease by reducing the channel width of the second pull-down transistor.

In some examples, as shown in FIGS. 11 and 12B, the channel length of the first pull-down transistor M4A is less than the channel length of the output transistor M3.

In some examples, as illustrated in FIGS. 11 and 12B, the width to length ratio of the channel of the second pull-down transistor M4B is greater than that of the first pull-down transistor M4A, thereby increasing the ability of the shift register to reduce the falling time of the gate driving signal at the far end of the gate line.

In some examples, as depicted in FIGS. 11 and 12B, the width to length ratio of the channel of the first pull-down transistor M4A is less than that of the output transistor M3, while the width to length ratio of the channel of the second pull-down transistor M4B is greater than that of the output transistor M3.

Figure 13A:
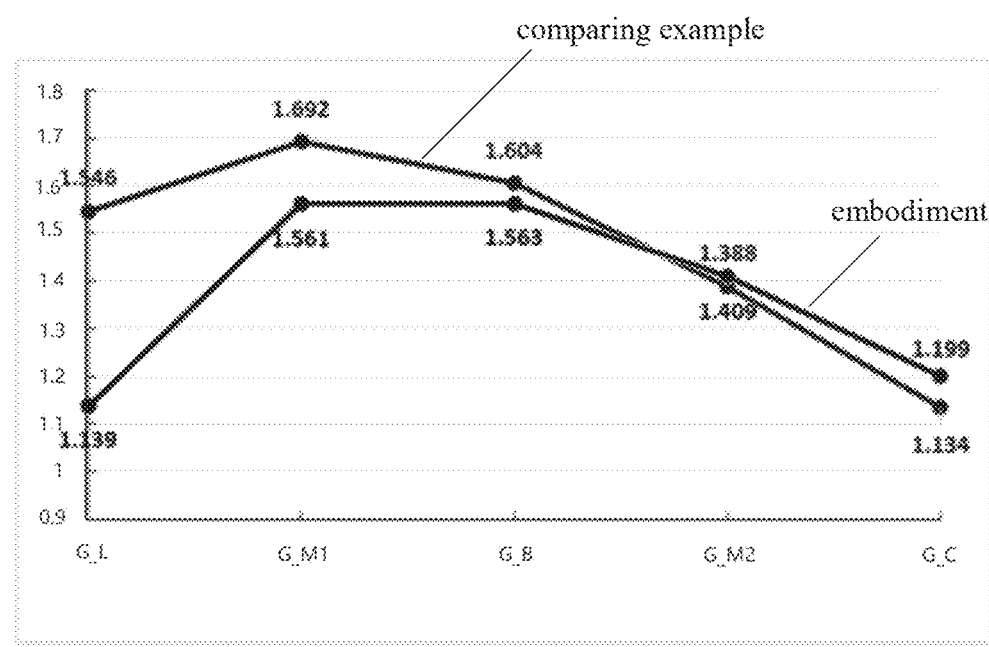
FIG. 13A depicts simulation results of shift registers provided in an embodiment of the disclosure.
Figure 13B:
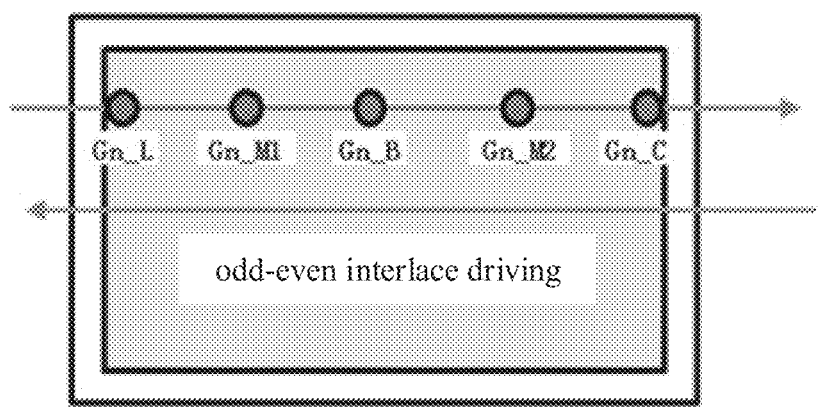
FIG. 13B illustrates sampling points of gate driving signals at different positions on a display substrate provided in an embodiment of the disclosure.

FIG. 13A shows the simulation results of a shift register provided in an embodiment of the disclosure; FIG. 13B illustrates the sampling points of the gate driving signal at different positions on the display substrate. The simulation in FIG. 13A is conducted under conditions where the first power voltage was −10V and the second power voltage was 30V; the channel widths of the output transistor M3 and the second pull-down transistor M4B in the comparing example in FIG. 13A can be referenced to relevant parameters in FIG. 12A; the channel widths of the output transistor M3, the first pull-down transistor M4A, and the second pull-down transistor M4B in the embodiment in FIG. 13A can be referenced to relevant parameters in FIG. 12B. FIG. 13B illustrates a schematic diagram of the gate driving signal at different positions on the display substrate, where Gn_L represents the near end position of the gate line, Gn_B represents the middle position of the gate line, Gn_C represents the far end position of the gate line, Gn_M1 represents the midpoint between Gn_L and Gn_B points, and Gn_M2 represents the midpoint between Gn_C and Gn_B points.

As shown in FIG. 13A, in the comparing example, due to the use of transistor M4B with a larger width to length ratio at the far end to pull down the gate driving signal, the falling time of the gate driving signal at position Gn_C is smaller. However, since only transistor M3 pulls down at position Gn_L, the falling time of the gate driving signal at this position is larger. As described above, the effective value of the gate driving signal is the maximum value at various points on the gate line. Therefore, unilaterally reducing the falling time of the gate driving signal at the far end of the gate line is ineffective; it is necessary to simultaneously reduce the falling time of the gate driving signal at both the near and far ends. Conversely, in the embodiment, because the first pull-down transistor M4A is added at the near end, after the falling time of the gate driving signal at the near end of the gate line is saturated when pulled down by M3, M4A can continue to further pull down the falling time of the gate driving signal at the near end of the gate line. This simultaneous reduction of the falling time of the gate driving signal at both the near and far ends of the gate line can achieve matching, effectively reducing the falling time of the gate driving signal.

Thus, as seen, the shift register provided in the disclosed embodiments effectively reduces the falling time of the gate driving signal without increasing the layout area. By adding the first pull-down transistor, after the falling time of the gate driving signal at the near end of the gate line is saturated when pulled down by the output transistor, the first pull-down transistor can be utilized to further reduce the falling time of the gate driving signal at the near end of the gate line, effectively reducing the falling time of the gate driving signal. Consequently, the display panel can adopt an odd-even interlace driving gate-on-array (GOA) design (especially for large-size products), achieving both narrow borders and higher refresh rates.

Figure 14:
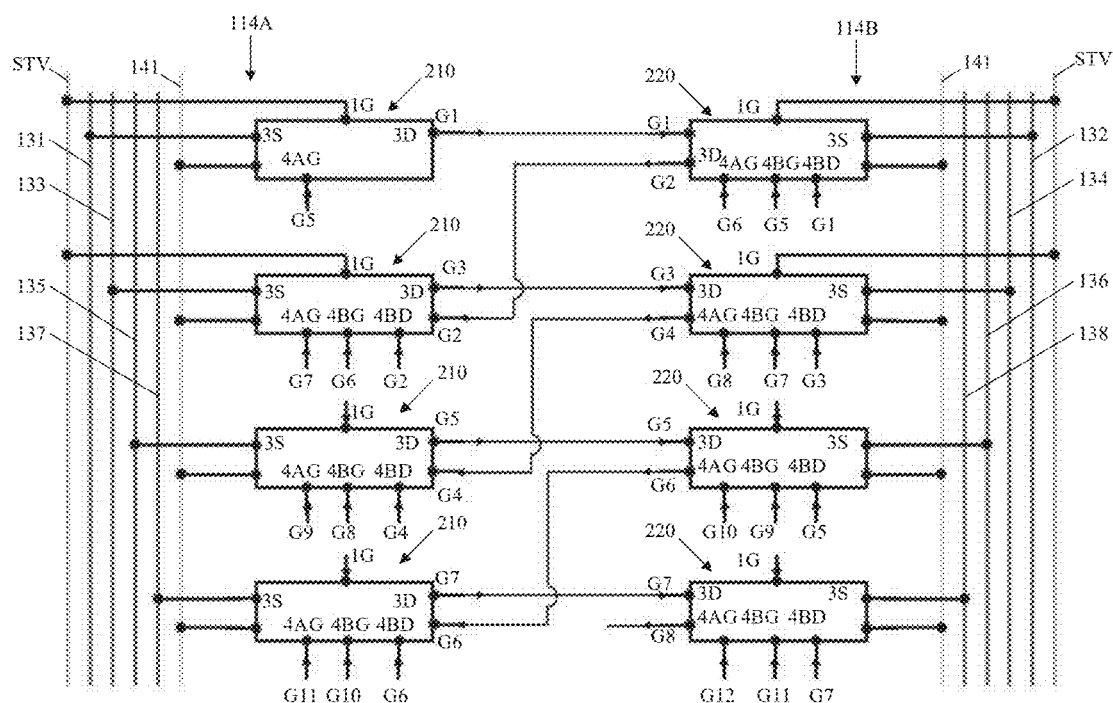
FIG. 14 illustrates a schematic diagram of cascaded shift registers in another display substrate provided in an embodiment of the disclosure.
Figure 15:
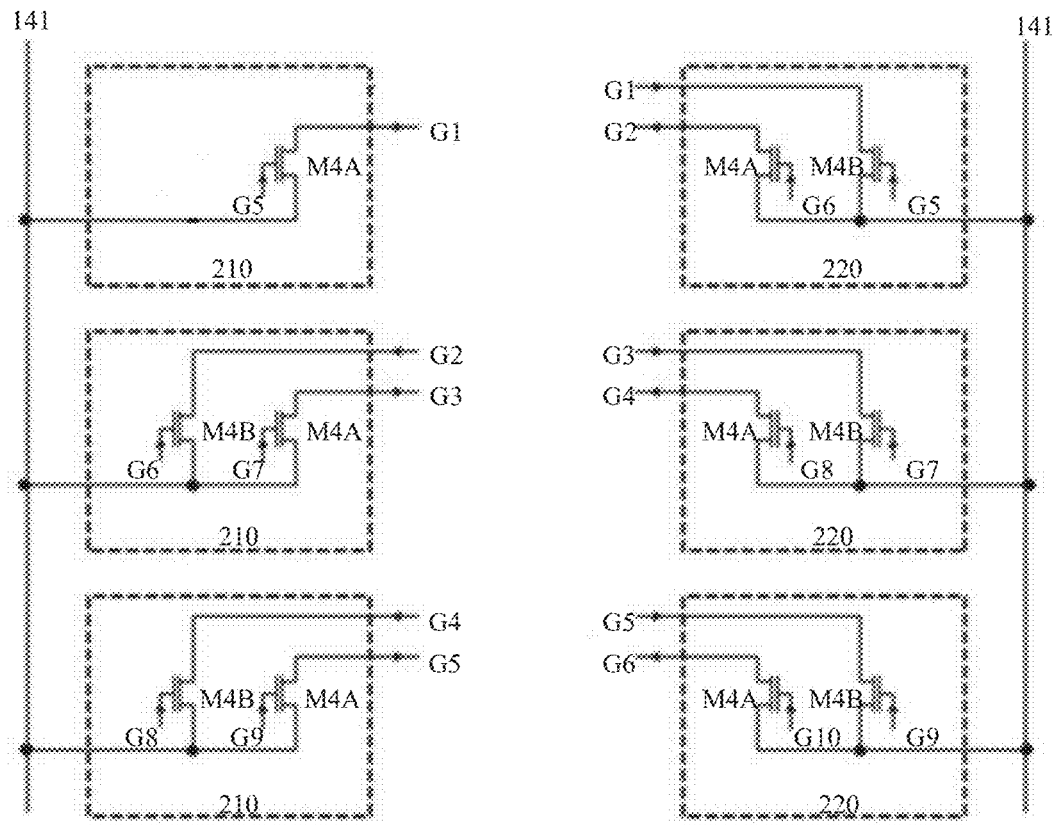
FIG. 15 illustrates a schematic diagram of cascaded shift registers in another display substrate provided in an embodiment of the disclosure.

FIG. 14 illustrates another schematic diagram of the cascade connection of shift registers provided in an embodiment of the disclosure; FIG. 15 illustrates another schematic diagram of the cascade connection of shift registers provided in an embodiment of the disclosure. In FIG. 14, only partial terminals of the input circuit, output circuit, first output pull-down circuit, and second output pull-down circuit are shown for each shift register, where G1 represents the control terminal of the input circuit 121, 3S represents the input terminal of the output circuit, 3D represents the output terminal of the output circuit, 4AG represents the control terminal of the first output pull-down circuit, and 4BG represents the control terminal of the second output pull-down circuit, and 4BD represents the output terminal of the second output pull-down circuit. In FIG. 15, only partial terminals of the first output pull-down circuit and the second output pull-down circuit are shown for each shift register, where M4A represents the first output pull-down circuit, and M4B represents the second output pull-down circuit.

As shown in FIGS. 14 and 15, the peripheral area includes the first sub-peripheral area 114A and the second sub-peripheral area 114B located on both sides of the display area 112; for example, the first sub-peripheral area 114A and the second sub-peripheral area 114B are located on the left and right sides of the display area, respectively. The first sub-peripheral area 114A comprises the first register region 210 and the (2j+1)th register region 210, while the second sub-peripheral area 114B comprises the second register region 220 and the (2j+2)th register region 220. The first register region 210 and the second register region 220 are arranged to be opposite to and spaced apart from each other, and similarly, the (2j+1)th register region 210 and the (2j+2)th register region 220 are arranged to be opposite to and spaced apart from each other.

As illustrated in FIGS. 14 and 15, the first register region 210 is provided with the input circuit, output circuit, and first output pull-down circuit of the first shift register 120, while the second register region 220 is provided with the input circuit, output circuit, first output pull-down circuit of the second shift register 120, and the second output pull-down circuit of the first shift register 120. Additionally, the (2j+1)th register region 210 is provided with the input circuit, output circuit, first output pull-down circuit of the (2j+1)th shift register 120, and the second output pull-down circuit of the (2j)th shift register 120, while the (2j+2)th register region 220 is provided with the input circuit, output circuit, first output pull-down circuit of the (2j+2)th shift register 120, and the second output pull-down circuit of the (2j+1)th shift register 120, where j is a positive integer greater than or equal to 1.

In brief, the first register region is not provided with the second output pull-down circuit (e.g., M4B) of the second shift register. Instead, after the last shift register, a separate output pull-down circuit can be individually set as the second output pull-down circuit of the last shift register.

Figure 16:
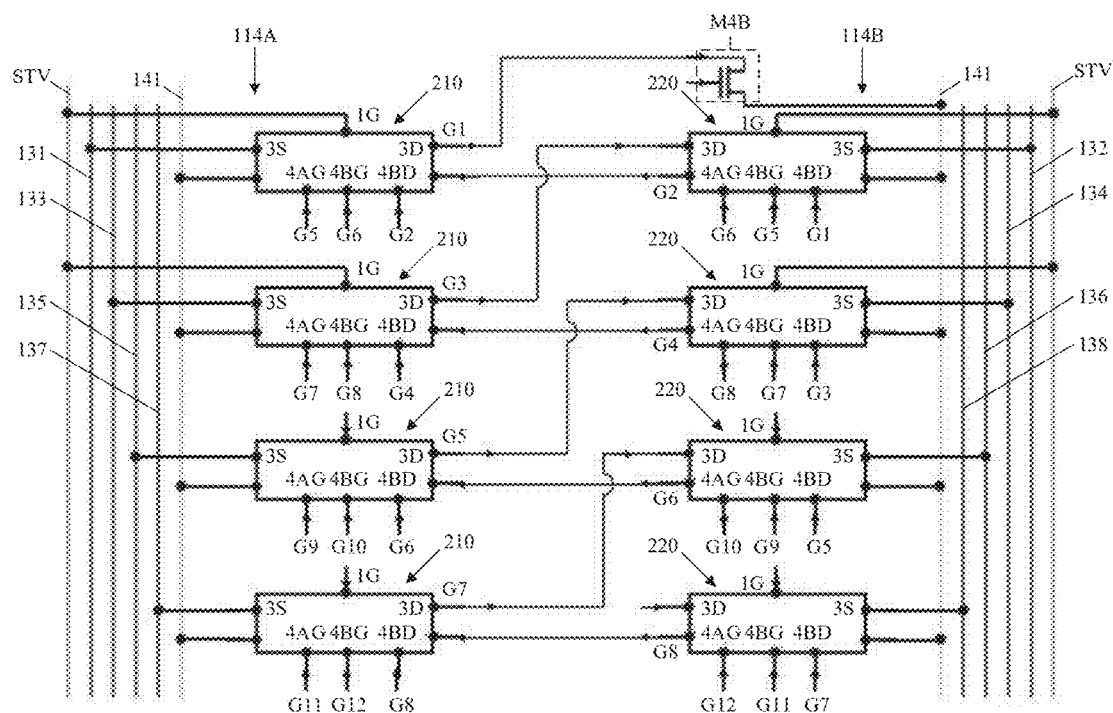
FIG. 16 illustrates a schematic diagram of cascaded shift registers in another display substrate provided in an embodiment of the disclosure.
Figure 17:
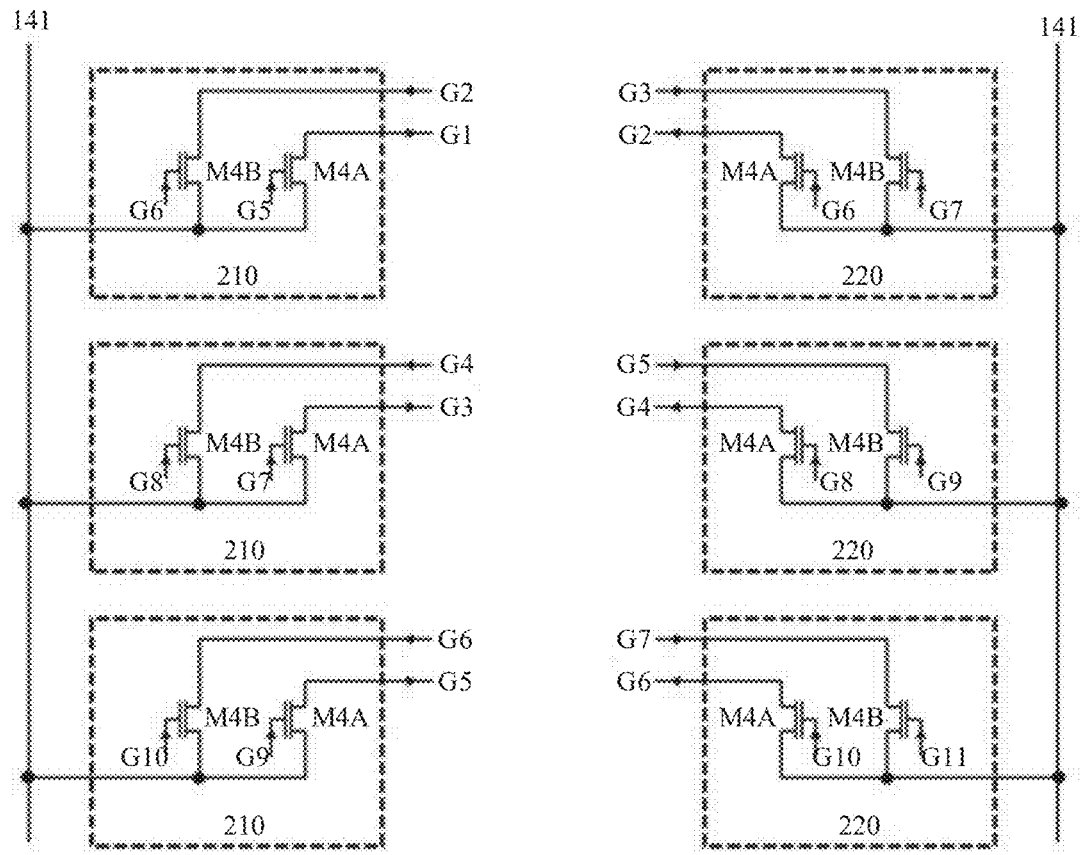
FIG. 17 illustrates a schematic diagram of cascaded shift registers in another display substrate provided in an embodiment of the disclosure.

FIG. 16 illustrates another schematic diagram of cascaded shift registers in a display panel according to an embodiment of the disclosure, while FIG. 17 shows another schematic diagram of cascaded shift registers in a display panel according to an embodiment of the disclosure. In FIG. 16, various shift registers only show partial terminals of the input circuit, output circuit, first output pull-down circuit, and second output pull-down circuit, where G1 represents the control terminal of the input circuit 121, 3S represents the input terminal of the output circuit, 3D represents the output terminal of the output circuit, 4AG represents the control terminal of the first output pull-down circuit, 4BG represents the control terminal of the second output pull-down circuit, and 4BD represents the output terminal of the second output pull-down circuit. In FIG. 17, various shift registers only show partial terminals of the first output pull-down circuit and the second output pull-down circuit, where M4A represents the first output pull-down circuit, and M4B represents the second output pull-down circuit.

As illustrated in FIGS. 16 and 17, the peripheral area includes the first sub-peripheral area 114A and the second sub-peripheral area 114B located on both sides of the display area 112; for example, the first sub-peripheral area 114A and the second sub-peripheral area 114B are located on the left and right sides of the display area, respectively. The first sub-peripheral area 114A comprises the first register region 210 and the (2j+1)th register region 210, while the second sub-peripheral area 114B comprises the second register region 220 and the (2j+2)th register region 220. The first register region 210 and the second register region 220 are arranged to be opposite to and spaced apart from each other, and similarly, the (2j+1)th register region 210 and the (2j+2)th register region 220 are arranged to be opposite to and spaced apart from each other.

As shown in FIGS. 16 and 17, the first register region 210 is provided with the input circuit, output circuit, and first output pull-down circuit of the first shift register 120, while the second register region 220 is provided with the input circuit, output circuit, first output pull-down circuit of the second shift register 120, and the second output pull-down circuit of the first shift register 120. Additionally, the (2j+1)th register region 210 is provided with the input circuit, output circuit, first output pull-down circuit of the (2j+1)th shift register 120, and the second output pull-down circuit of the (2j)th shift register 120, while the (2j+2)th register region 220 is provided with the input circuit, output circuit, first output pull-down circuit of the (2j+2)th shift register 120, and the second output pull-down circuit of the (2j+1)th shift register 120. The second output pull-down circuit of the first shift register 120 is disposed on a side of the second register region 220 away from the (2j+2)th shift register. In this case, the second output pull-down circuit is not disposed in the last register region.

Figure 18:
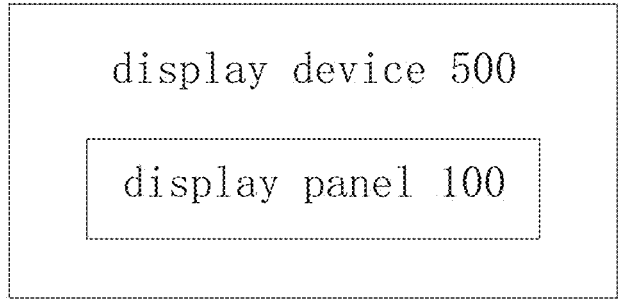
FIG. 18 illustrates a schematic diagram of a display device provided in an embodiment of the disclosure.

At least one embodiment of the disclosure further provides a display device. FIG. 18 illustrates a schematic diagram of the display device provided in an embodiment of the present disclosure. As shown in FIG. 18, the display device 500 includes the display panel 100 provided in any of the embodiments described above. Thus, the display device can achieve high resolution and refresh rates (suitable for large-sized products) while utilizing a gate-on-array (GOA) circuit with odd-even interlace driving to further reduce costs and minimize bezel width, making the product more competitive in the market.

For example, the display device can be a television, monitor, electronic picture frame, digital photo frame, navigation system, laptop, tablet, smartphone, or any other electronic device with display functionality.

Several points need to be clarified:
(1) In the accompanying drawings of the embodiments disclosed herein, only the structures related to the embodiments are depicted, while other structures can be designed conventionally.

(2) Features in the same or different embodiments of the disclosure can be combined with each other as long as they are not conflicting.

The above embodiments are only specific implementations of the present disclosure, and the scope of protection of the present disclosure is not limited thereto. Any variations or substitutions that are readily apparent to those skilled in the art within the technical scope disclosed in the present disclosure should be encompassed within the scope of protection of the present disclosure. Therefore, the scope of protection of the present disclosure should be determined by the scope of protection of the claims.

The invention claimed is:

1. A display substrate comprising:
a substrate and a shift register, a clock signal line, and a first power voltage line disposed on the substrate;
a gate line extending along a first direction; and
a plurality of pixel rows arranged along a second direction intersecting the first direction, each of the pixel rows comprising multiple pixel units arranged along the first direction,
wherein the clock signal line is configured to provide a clock signal to the shift register, and the first power voltage line is configured to provide a first power voltage to the shift register;
the shift register comprises an input circuit, an output circuit, and a first output pull-down circuit, the input circuit comprises a control terminal, an input terminal, and an output terminal, the output circuit comprises a control terminal, an input terminal, and an output terminal, the output terminal of the input circuit and the control terminal of the output circuit are connected to a first node, the input terminal of the output circuit is connected to the clock signal line;
the input circuit is configured to respond to a first driving signal on the control terminal of the input circuit to write an input signal on the input terminal of the input circuit into the first node, the output circuit is configured to respond to the signal on the first node to output the clock signal on the clock signal line as a gate driving signal through the output terminal of the output circuits;
the first output pull-down circuit comprises a control terminal, an input terminal, and an output terminal, the input terminal of the first output pull-down circuit is connected to the first power voltage line, the output terminal of the first output pull-down circuit is connected to the output terminal of the output circuit, the first output pull-down circuit is configured to respond to a second driving signal on the control terminal of the first output pull-down circuit to reduce a falling time of the gate driving signal at the output terminal of the output circuit by the first power voltage;
the gate line is connected to the multiple pixel units in a pixel row to provide the gate driving signal to the multiple pixel units, the gate line comprises a first end and a second end located at opposite sides of the pixel row, the first end of the gate line is connected to the output terminal of the output circuit,
the shift register further comprises a second output pull-down circuit which comprises a control terminal, an input terminal, and an output terminal, the input terminal of the second output pull-down circuit is connected to the first power voltage line, the second end of the gate line is connected to the output terminal of the second output pull-down circuit, the second output pull-down circuit is configured to respond to a third driving signal on the control terminal of the second output pull-down circuit to reduce the falling time of the gate driving signal at the second end by the first power voltage.

2. The display substrate according to claim 1, wherein the second driving signal and the third driving signal are the same.

3. The display substrate according to claim 1, wherein the substrate includes a display area and a peripheral area, the peripheral area comprises a first sub-peripheral area and a second sub-peripheral area located on opposite sides of the display area,
wherein the input circuit, the output circuit, and the first output pull-down circuit of the shift register is located in one of the first sub-peripheral area and the second sub-peripheral area, and the second output pull-down circuit of the shift register is located in the other of the first sub-peripheral area and the second sub-peripheral area.

4. The display substrate according to claim 3, wherein the display substrate comprises M shift registers and M gate lines, each of the M shift registers provides the gate driving signal to respective M gate lines, the ith shift register provides the gate driving signal to the ith gate line, where i is an integer greater than or equal to 1 and less than or equal to M,
of the M shift registers, the (2n+1)th shift register is located in the first sub-peripheral area and the (2n+2)th shift register is located in the second sub-peripheral area, where n is an integer greater than or equal to 0.

5. The display substrate according to claim 4, wherein the first sub-peripheral area comprises a first register region and a (2j+1)th register region, the second sub-peripheral area comprises a second register region and a (2j+2)th register region, the first register region and the second register region are arranged to be opposite to and spaced apart from each other, and the (2j+1)th register region and the (2j+2)th register region are arranged to be opposite to and spaced apart from each other,
the first register region is provided with the input circuit, the output circuit, and the first output pull-down circuit of the first shift register and the second output pull-down circuit of the second shift register, the second register region is provided with the input circuit, the output circuit, and the first output pull-down circuit of the second shift register and the second output pull-down circuit of the first shift register,
the (2j+1)th register region is provided with the input circuit, the output circuit, and the first output pull-down circuit of the (2j+1)th shift register and the second output pull-down circuit of the (2j+2)th shift register, the (2j+2)th register region is provided with the input circuit, the output circuit, and the first output pull-down circuits of the (2j+2)th shift register and the second output pull-down circuits of the (2j+1)th shift register,
where j is an integer greater than or equal to 1.

6. The display substrate according to claim 4, wherein the first sub-peripheral area comprises a first register region and a (2j+1)th register region, the second sub-peripheral area comprises a second register region and a (2j+2)th register region, the first register region and the second register region are arranged to be opposite to and spaced apart from each other, and the (2j+1)th register region and the (2j+2)th register region are arranged to be opposite to and spaced apart from each other, the first register region is provided with the input circuit, the output circuit, and the first output pull-down circuit of the first shift register, the second register region is provided with the input circuit, the output circuit, and the first output pull-down circuit of the second shift register and the second output pull-down circuit of the first shift register, the (2j+1)th register region is provided with the input circuit, the output circuit, and the first output pull-down circuit of the (2j+1)th shift register and the second output pull-down circuit of the (2j)th shift register, the (2j+2)th register region is provided with the input circuit, the output circuit, and the first output pull-down circuit of the (2j+2)th shift register and the second output pull-down circuit of the (2j+1)th shift register, where j is an integer greater than or equal to 1.

7. The display substrate according to claim 6, wherein the second output pull-down circuit of the first shift register is disposed on a side of the second register region away from the (2j+2)th shift register.

8. The display substrate according to claim 4, wherein the control terminal of the first output pull-down circuit of the mth shift register is electrically connected to the output terminal of the output circuit of the (m+k)th shift register, where m is an integer greater than or equal to 1 and k is an integer greater than or equal to 1.

9. The display substrate according to claim 8, wherein the display substrate comprises p clock signal lines, and k=p/2.

10. The display substrate according to claim 8, wherein the control terminal of the second output pull-down circuit of the mth shift register is electrically connected to the output terminal of the output circuit of the (m+k)th shift register.

11. The display substrate according to claim 4, wherein the input circuit comprises an input transistor, the output circuit comprises an output transistor, and the first output pull-down circuit comprises a first pull-down transistor, wherein the input transistor comprises a gate electrode, a first electrode, and a second electrode, the output transistor comprises a gate electrode, a first electrode, and a second electrode, the first pull-down transistor comprises a gate electrode, a first electrode, and a second electrode, the second electrode of the input transistor and the gate electrode of the output transistor are connected to the first node, the first electrode of the output transistor is connected to the clock signal line, the first electrode of the first pull-down transistor is configured to receive the first power voltage, and the second electrode of the first pull-down transistor is connected to the second electrode of the output transistor.

12. The display substrate according to claim 11, wherein the (2n+1)th shift register and the (2n+2)th shift register are arranged to be opposite to and spaced apart from each other;

in the (2n+1)th shift register, an orthographic projection of the first pull-down transistor on the substrate is located on a side of an orthographic projection of the output transistor on the substrate close to the (2n+2)th shift register;

in the (2n+2)th shift register, an orthographic projection of the first pull-down transistor on the substrate is located on a side of an orthographic projection of the output transistor on the substrate close to the (2n+1)th shift register.

13. The display substrate according to claim 11, wherein the second output pull-down circuit comprises a second pull-down transistor comprising a gate electrode, a first electrode, and a second electrode, the first electrode of the second pull-down transistor is configured to receive the first power voltage, and the second electrode of the second pull-down transistor is connected to the second end of the gate line.

14. The display substrate according to claim 13, wherein the (2n+1)th shift register and the (2n+2)th shift register are arranged to be opposite to and spaced apart from each other;

an orthographic projection of the second pull-down transistor of the (2n+1)th shift register on the substrate is located between an orthographic projection of the output transistor of the (2n+2)th shift register on the substrate and an orthographic projection of the first pull-down transistor of the (2n+2)th shift register on the substrate;

an orthographic projection of the second pull-down transistor of the (2n+2)th shift register on the substrate is located between an orthographic projection of the output transistor of the (2n+1)th shift register and an orthographic projection of the first pull-down transistor of the (2n+1)th shift register on the substrate.

15. The display substrate according to claim 13, wherein a width to length ratio of a channel of the second pull-down transistor is greater than a width to length ratio of the channel of the first pull-down transistor.

16. The display substrate according to claim 15, wherein the width to length ratio of the channel of the first pull-down transistor is less than a width to length ratio of a channel of the output transistor, and the width to length ratio of the channel of the second pull-down transistor is greater than the width to length ratio of the channel of the output transistor.

17. The display substrate according to claim 1, wherein the shift register further comprises a first control circuit, a second control circuit, a first noise reduction circuit, and a second noise reduction circuit;

an output terminal of the first control circuit and an output terminal of the second control circuit are connected to a second node, a control terminal and an input terminal of the first control circuit are connected to a second power voltage line, an input terminal of the second control circuit is configured to receive the first power voltage, and a control terminal of the second control circuit is connected to the first node, the first control circuit is configured to respond to a second power voltage on the second power voltage line and pull up a potential of the second node by the second power voltage, the second control circuit is configured to respond to the signal on the first node to pull down the potential of the second node by the first power voltage;

a control terminal of the first noise reduction circuit and a control terminal of the second noise reduction circuit are connected to the second node, an input terminal of the first noise reduction circuit and an input terminal of the second noise reduction circuit are configured to receive the first power voltage, an output terminal of the first noise reduction circuit is connected to the first node, and an output terminal of the second noise reduction circuit is connected to the output terminal of the output circuit, the first noise reduction circuit is configured to respond to the signal on the second node to reduce noise on the first node by the first power voltage, the second noise reduction circuit is configured to respond to the signal on the second node to reduce noise on the output terminal of the output circuit by the first power voltage.

18. The display substrate according to claim 17, wherein the first control circuit comprises a first control transistor, the second control circuit comprises a second control transistor, the first noise reduction circuit comprises a first noise reduction transistor, and the second noise reduction circuit comprises a second noise reduction transistor, the first control transistor comprises a gate electrode, a first electrode, and a second electrode, the second control transistor comprises a gate electrode, a first electrode, and a second electrode, the first noise reduction transistor comprises a gate electrode, a first electrode, and a second electrode, the second noise reduction transistor comprises a gate electrode, a first electrode, and a second electrode, the first electrode and the gate electrode of the first control transistor are connected to the second power voltage line, the second electrode of the first control transistor and the second electrode of the second control transistor are connected to the second node, the gate electrode of the second control transistor is connected to the first node, the first electrode of the second control transistor is connected to the first power voltage line, the gate electrode of the first noise reduction transistor and the gate electrode of the second noise reduction transistor are connected to the second node, the first electrode of the first noise reduction transistor and the first electrode of the second noise reduction transistor are configured to receive the first power voltage, the second electrode of the first noise reduction transistor is connected to the first node, and the second electrode of the second noise reduction transistor is connected to the output terminal of the output circuit.

19. The display substrate according to claim 17, wherein the shift registers further comprise a reset circuit comprising a control terminal, an input terminal, and an output terminal, wherein the control terminal of the reset circuit is configured to respond to a fourth driving signal to reset the signal on the first node by the first power voltage, wherein the display substrate comprises p clock signal lines, the control terminal of the reset circuit of the nth shift register is electrically connected to the output terminal of any one of the (n+k)th to (n+p−1)th shift registers, and k=p/2, wherein the reset circuit comprises a reset transistor comprising a gate electrode, a first electrode, and a second electrode, the first electrode of the reset transistor is configured to receive the first power voltage, and the second electrode of the reset transistor is connected to the first node.

20. A display device comprising the display substrate according to claim 1.

* * * * *